(12) United States Patent
Kamura et al.

(10) Patent No.: US 9,831,976 B2
(45) Date of Patent: Nov. 28, 2017

(54) OPTICAL TRANSMISSION APPARATUS, OPTICAL TRANSMISSION SYSTEM, AND TRANSMISSION WAVELENGTH CONTROL METHOD

(71) Applicant: FUJITSU LIMITED, Kawasaki-shi (JP)

(72) Inventors: Yuji Kamura, Ota (JP); Yoshinori Tochiki, Kawasaki (JP); Taku Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 14/989,933

(22) Filed: Jan. 7, 2016

(65) Prior Publication Data

US 2016/0204876 A1 Jul. 14, 2016

(30) Foreign Application Priority Data

Jan. 13, 2015 (JP) .................................. 2015-004053

(51) Int. Cl.
*H04B 10/572* (2013.01)
*H04J 14/02* (2006.01)
*H04B 10/2569* (2013.01)
*H04B 10/2507* (2013.01)

(52) U.S. Cl.
CPC ...... *H04J 14/0227* (2013.01); *H04B 10/2569* (2013.01); *H04B 10/2572* (2013.01)

(58) Field of Classification Search
CPC ............. H04J 14/0227; H04B 10/2572; H04B 10/2569; H04B 10/572
See application file for complete search history.

(56) References Cited

U.S. PATENT DOCUMENTS

| | | | |
|---|---|---|---|
| 6,600,592 B2 * | 7/2003 | Islam | H01S 3/302 359/334 |
| 6,930,824 B1 * | 8/2005 | Ishikawa | H04B 10/25133 359/341.32 |
| 7,002,696 B1 * | 2/2006 | Miron | G02B 6/29358 356/519 |
| 7,901,870 B1 * | 3/2011 | Wach | G02B 5/285 430/321 |
| 2005/0169633 A1 * | 8/2005 | Nakagawa | H04B 10/572 398/85 |
| 2007/0264021 A1 * | 11/2007 | Li | H04J 14/02 398/135 |
| 2009/0226168 A1 * | 9/2009 | Boduch | H04J 14/0204 398/48 |

(Continued)

FOREIGN PATENT DOCUMENTS

| | | |
|---|---|---|
| JP | 2000-228649 | 8/2000 |
| JP | 2014-78851 | 5/2014 |

*Primary Examiner* — Danny Leung
(74) *Attorney, Agent, or Firm* — Staas & Halsey LLP

(57) ABSTRACT

An optical transmission apparatus for transmitting wavelength-multiplexed light, the optical transmission apparatus includes: an optical transmitter configured to transmit light of a third wavelength to be arranged between a first wavelength and a second wavelength adjacent to the third wavelength in the wavelength-multiplexed light, and a controller configured to control a bandwidth of the light of the third wavelength to be arranged in a first bandwidth narrower than a spacing between the first wavelength and the second wavelength.

10 Claims, 27 Drawing Sheets

(56) References Cited

U.S. PATENT DOCUMENTS

| | | | |
|---|---|---|---|
| 2011/0064411 A1* | 3/2011 | Eiselt | H04B 10/272 398/82 |
| 2012/0076506 A1* | 3/2012 | Goebuchi | H04B 10/615 398/202 |
| 2013/0223844 A1* | 8/2013 | Hwang | H04B 10/572 398/91 |
| 2013/0251368 A1* | 9/2013 | Kim | H04B 10/572 398/58 |
| 2014/0199075 A1* | 7/2014 | Huh | H04B 10/572 398/79 |
| 2014/0233956 A1* | 8/2014 | Zami | H04J 14/02 398/79 |
| 2014/0314411 A1* | 10/2014 | Huang | H04J 14/0298 398/65 |
| 2014/0314415 A1* | 10/2014 | Vassilieva | H04J 14/0227 398/76 |
| 2014/0314416 A1* | 10/2014 | Vassilieva | H04B 3/32 398/76 |
| 2015/0071641 A1* | 3/2015 | Wen | H04B 10/5165 398/98 |
| 2015/0125152 A1* | 5/2015 | Ji | H04B 10/5561 398/76 |
| 2015/0333860 A1* | 11/2015 | Rahn | H04L 27/0008 398/34 |
| 2015/0333864 A1* | 11/2015 | Swinkels | H04J 14/0227 398/79 |
| 2016/0049769 A1* | 2/2016 | Choi | H01S 3/106 372/20 |
| 2016/0080087 A1* | 3/2016 | Koike-Akino | H04B 10/516 398/79 |
| 2016/0112141 A1* | 4/2016 | Rahn | H04J 14/0256 398/79 |
| 2016/0119063 A1* | 4/2016 | Guo | H04B 10/572 398/79 |
| 2016/0204876 A1* | 7/2016 | Kamura | H04J 14/0227 398/34 |
| 2016/0204899 A1* | 7/2016 | Kojima | H04J 14/0257 714/776 |
| 2016/0381441 A1* | 12/2016 | Nagamine | H04J 14/0224 398/95 |
| 2017/0054268 A1* | 2/2017 | Okada | H01S 3/10007 |

\* cited by examiner

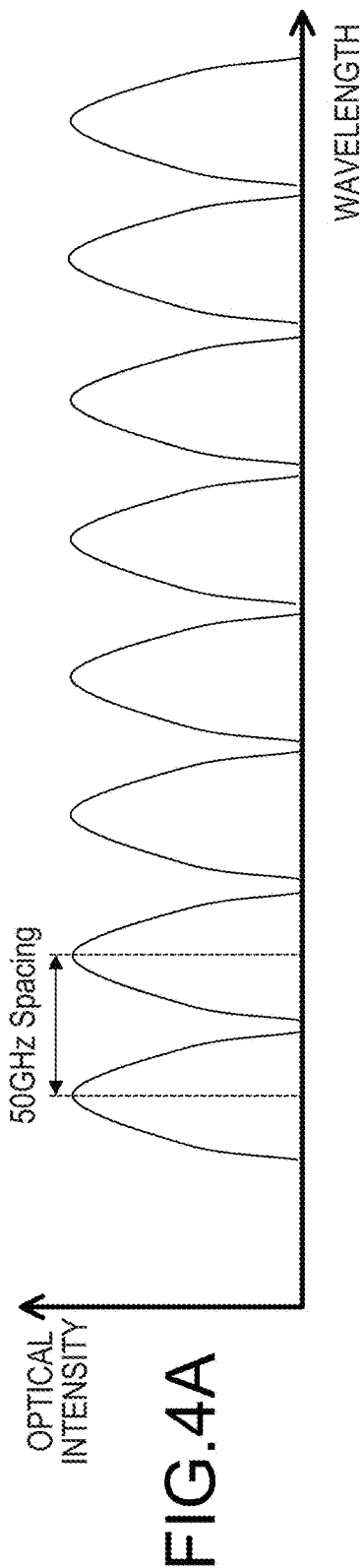
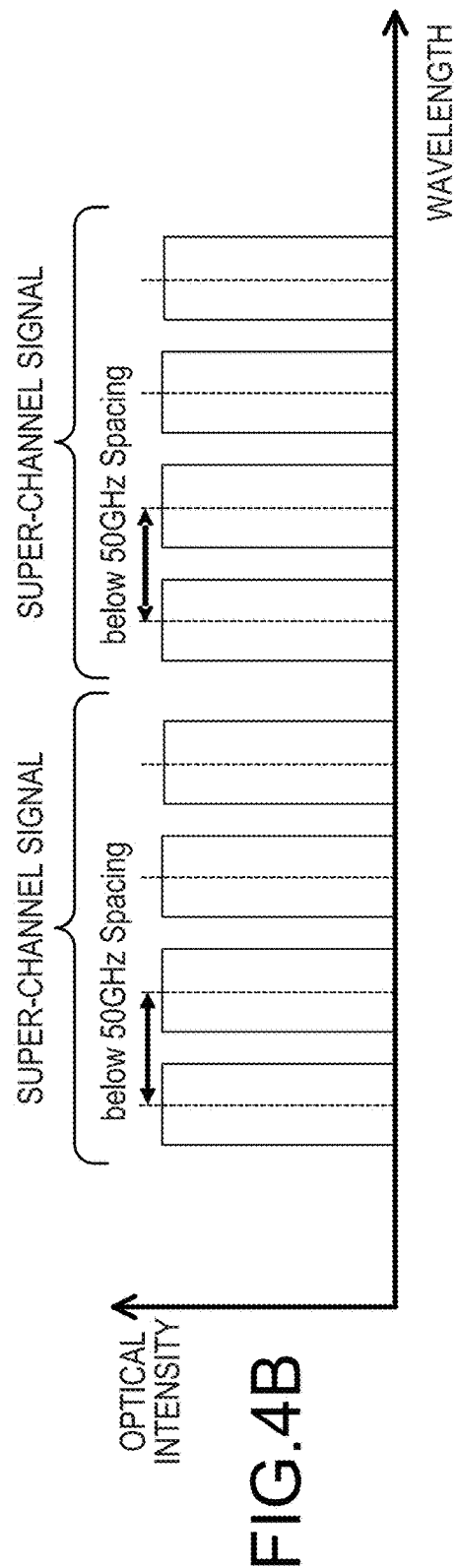

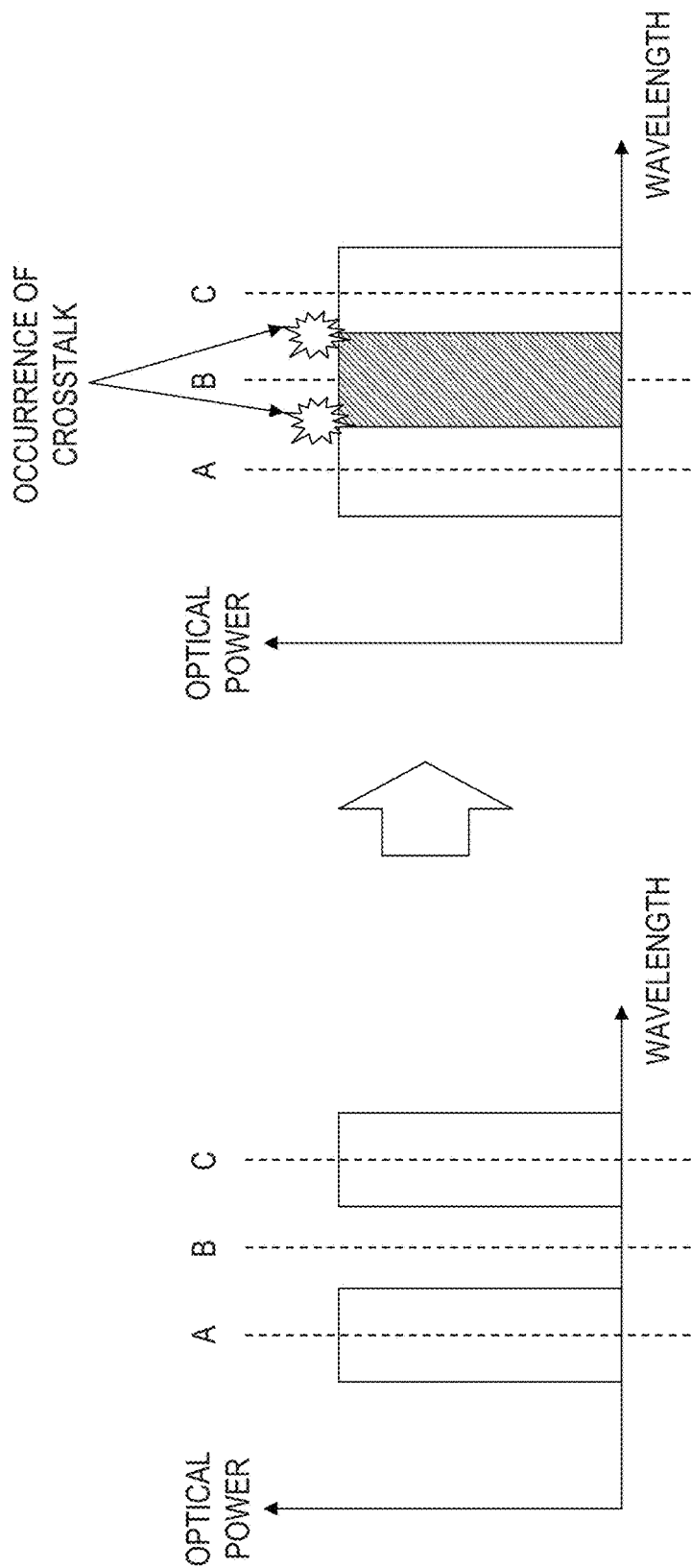

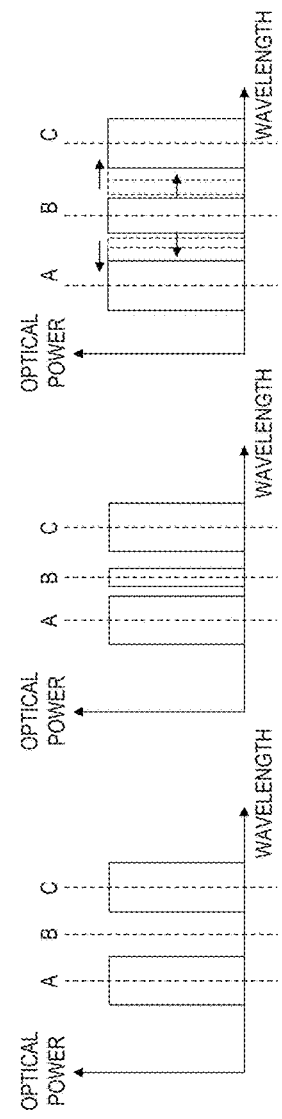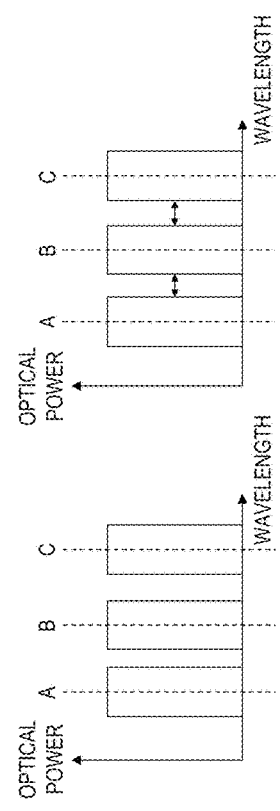

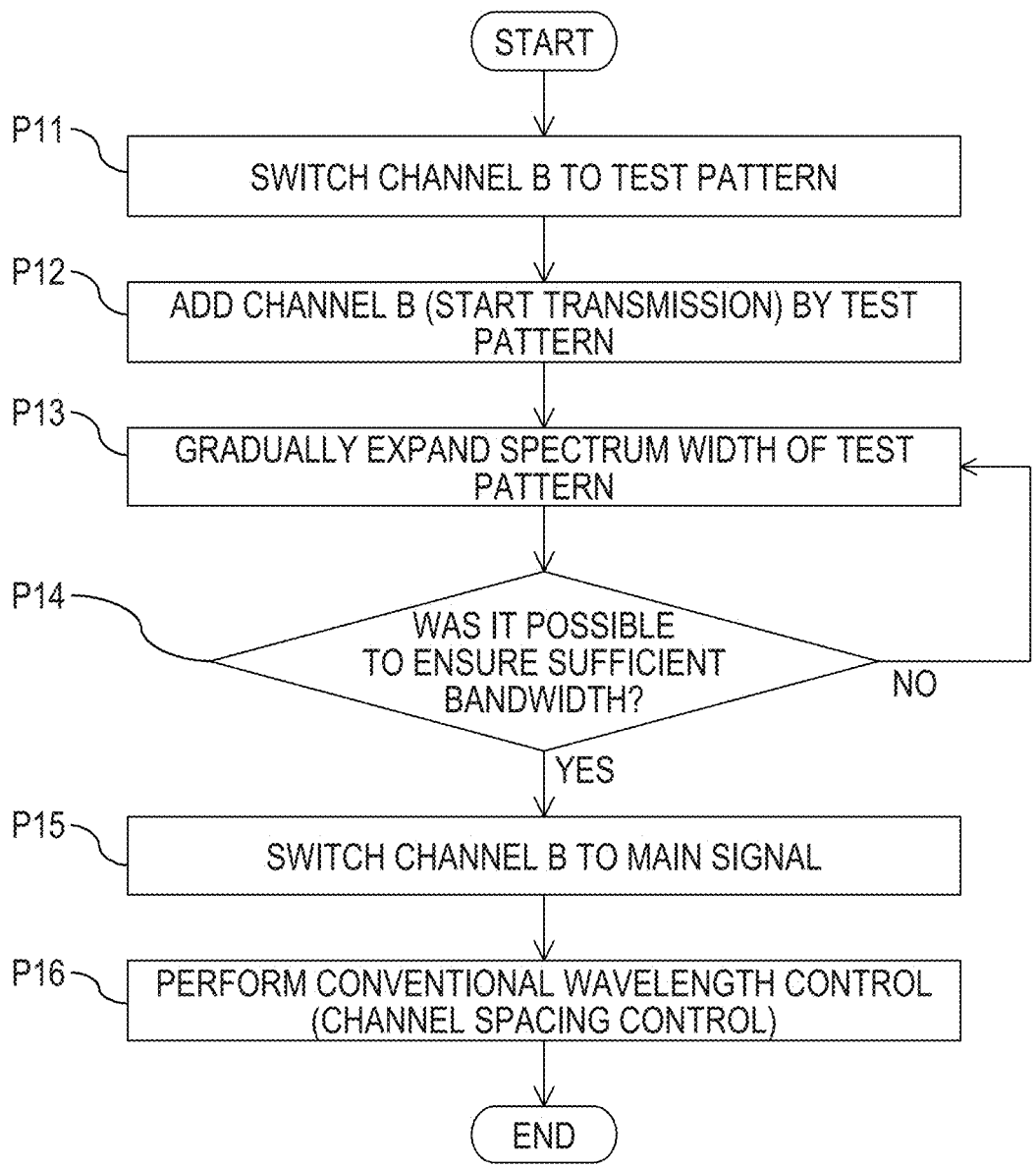

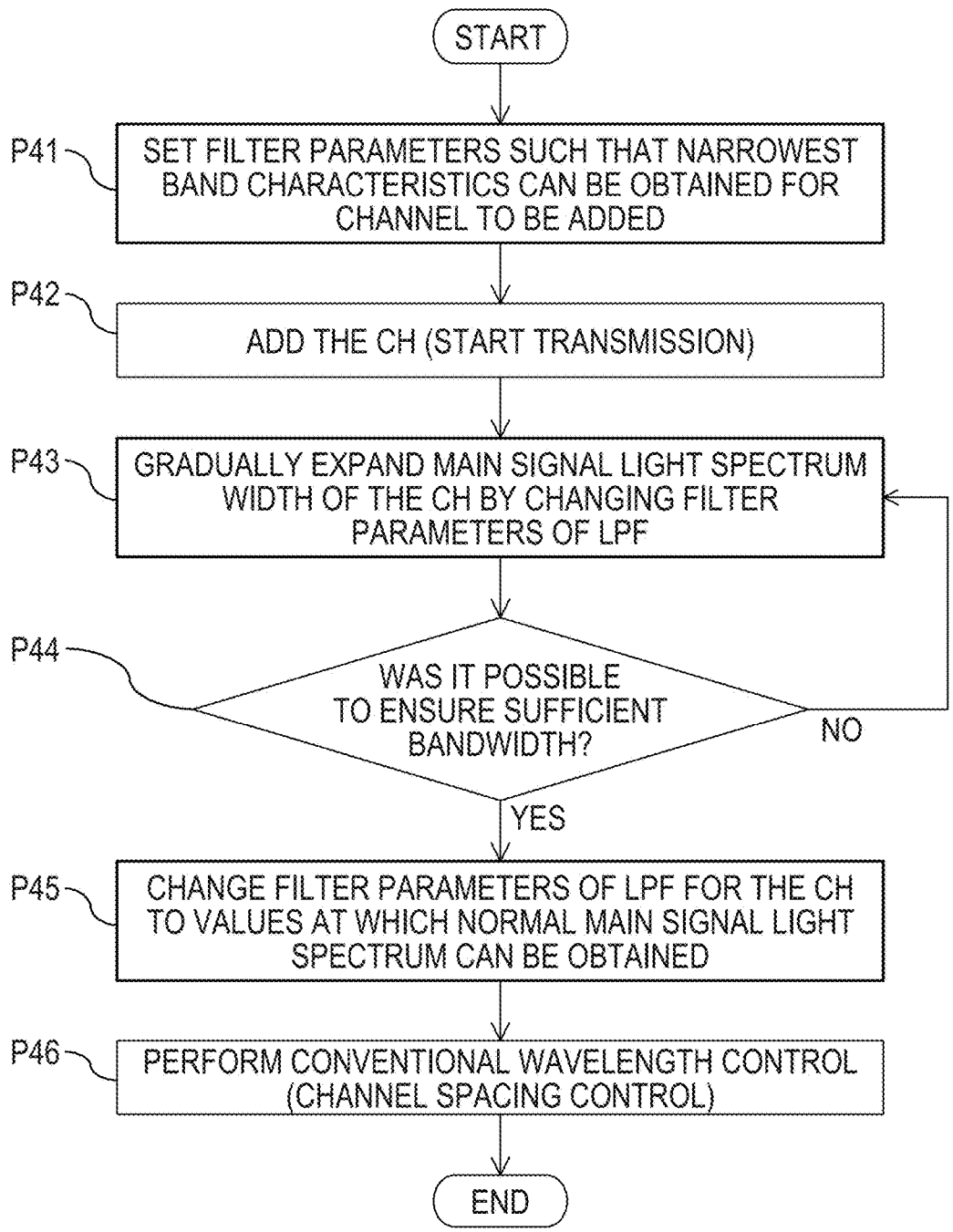

OPTICAL TRANSMISSION APPARATUS, OPTICAL TRANSMISSION SYSTEM, AND TRANSMISSION WAVELENGTH CONTROL METHOD

CROSS-REFERENCE TO RELATED APPLICATION

This application is based upon and claims the benefit of priority from the prior Japanese Patent Application No. 2015-004053, filed on Jan. 13, 2015, the entire contents of which are incorporated herein by reference.

FIELD

The embodiments discussed herein are related to an optical transmission apparatus, an optical transmission system, and a transmission wavelength control method.

BACKGROUND

As one of optical communication techniques, there is a technique for wavelength multiplexing of light having plural wavelengths (may be referred to as "channels") with high density and transmitting the wavelength-multiplexed light.

Such an optical transmission technique may be referred to as "super-channel transmission." In the super-channel transmission, by narrowing the spectrum of the signal light to be transmitted by using digital signal processing, a channel spacing may be more narrowed than that in conventional wavelength division multiplexing (WDM) transmission. Therefore, it is possible to improve the frequency utilization efficiency of an optical transmission band available in an optical transmission system.

Related techniques are disclosed in, for example, Japanese Laid-open Patent Publication No. 2000-228649 and Japanese Laid-open Patent Publication No. 2014-078851.

SUMMARY

According to an aspect of the invention, an optical transmission apparatus for transmitting wavelength-multiplexed light, the optical transmission apparatus includes: an optical transmitter configured to transmit light of a third wavelength to be arranged between a first wavelength and a second wavelength adjacent to the third wavelength in the wavelength-multiplexed light, and a controller configured to control a bandwidth of the light of the third wavelength to be arranged in a first bandwidth narrower than a spacing between the first wavelength and the second wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of channel arrangement of a conventional WDM optical signal, and FIG. 4B is a diagram illustrating an example of channel arrangement of a super-channel signal;

FIG. 15 is a schematic diagram illustrating that crosstalk may occur by a channel added to the super-channel signal;

FIGS. 16A-16E are schematic diagrams explaining an outline of the wavelength control according to the embodiment;

FIG. 17 is a flowchart explaining an outline of the wavelength control according to the embodiment;

FIG. 27 is a flowchart explaining an operation of the modification of the third embodiment.

DESCRIPTION OF EMBODIMENTS

Figure 1:
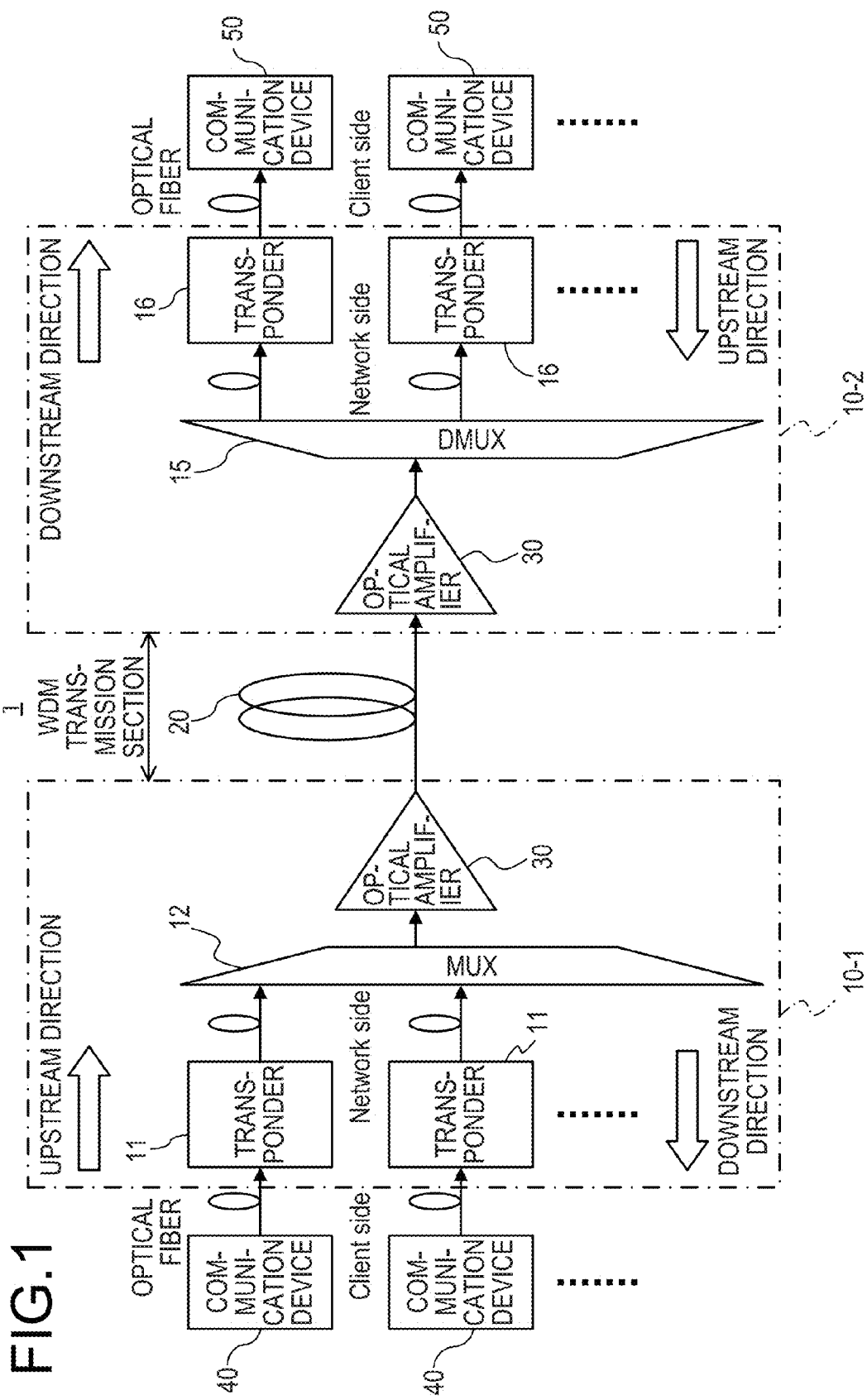
FIG. 1 is a block diagram illustrating an exemplary configuration of a WDM optical network as an example of an optical transmission system.

When a channel spacing becomes narrow as in the super-channel transmission, one of the issues to be considered is that how a new channel is added between adjacent channels.

For example, one of the issues to be considered is that how to add a new channel without affecting the signal light of adjacent channels.

Hereinafter, embodiments of techniques for adding another channel between adjacent channels without affecting the channels will be described with reference to the accompanying drawings. However, the embodiments to be described below are merely illustrative and are not intended to exclude various modifications and applications of techniques not specified below. Further, the embodiments to be described below may be carried out appropriately in combination. In the drawings used in the following embodiments, portions denoted by the same reference numerals, unless otherwise specified, represent the same or like parts.

In recent years, as the traffic of communication devices is increased, a demand for even larger capacity and higher speed of network is increasing. For example, in an optical transmission apparatus as an example of an element of the optical network, a digital coherent signal processing technique using a dual polarization-quadrature phase shift keying (DP-QPSK) modulation scheme may be employed.

By employing the digital coherent signal processing technique, it is possible to increase the transmission speed per wavelength (which may be referred to as "channel") to, for example, 100 gigabits/sec (Gbps) or a speed higher than 100 Gbps.

Further, by using wavelength division multiplexing (WDM) technology in combination, the maximum transmission capacity of the optical network may be enlarged. For example, an optical signal of 100 Gbps per channel can be wavelength-multiplexed for up to 88 channels. That is, it is possible to enlarge the maximum transmission capacity per optical fiber to 8.8 terabits/sec (Tbps).

FIG. 1 illustrates an exemplary configuration of a WDM optical network as an example of an optical transmission system. A WDM optical network 1 illustrated in FIG. 1 includes, for example, an optical transmission apparatus 10-1 and an optical transmission apparatus 10-2 which is connected to the optical transmission apparatus 10-1 via an optical transmission line 20 to enable an optical communication with the optical transmission apparatus 10-1.

When the optical transmission apparatuses 10-1 and 10-2 are not to be distinguished from each other, the optical transmission apparatuses 10-1 or 10-2 may be simply referred to as an "optical transmission apparatus 10." The optical transmission apparatus 10 is an example of an element (network element NE) of the WDM optical network 1. An optical transmitting station, an optical receiving station, an optical relay station, an optical add-drop station such as a reconfigurable optical add/drop multiplexer (ROADM) or the like may be applicable to the NE 10. "Station" may be referred to as "node."

By way of example, in FIG. 1, the NE 10-1 corresponds to an optical transmitting station (optical transmitting node), and the NE 10-2 corresponds to an optical receiving station (optical receiving node).

The optical transmission line 20 is, for example, an optical fiber transmission line. In the optical transmission line 20, an optical amplifier 30 may be provided appropriately depending on a transmission distance of a WDM optical signal. A node provided with the optical amplifier 30 may be regarded as corresponding to an optical relay node. Meanwhile, depending on the transmission distance of the WDM optical signal, the optical amplifier 30 may not be provided as well.

The optical transmission apparatus 10-1 may include, as illustrated in FIG. 1, a plurality of transponders 11, a wavelength multiplexer (MUX) 12, and the optical amplifier 30.

Each of the transponders 11 may be connected to a communication device 40 such as a router or the like via an optical fiber 22. The communication device 40 is, for example, a communication device 40 on a client side (may be referred to as "tributary side"). A signal transmitted from the communication device 40 is converted into an optical signal of one wavelength (channel) after being received by the corresponding transponder 11, and is input to the multiplexer 12.

Meanwhile, an optical fiber may be used for the connection between each of the transponders 11 and the multiplexer 12. In other words, each of the transponders 11 and the multiplexer 12 may be optically connected to be enabled for an optical communication.

The multiplexer 12 may be a multiplexing coupler such as a WDM coupler, and generates a WDM optical signal by wavelength-multiplexing the optical signal received from each of the transponders 11 to transmit the WDM optical signal to the optical transmission line 20. In the transmission, the WDM optical signal may be amplified to a predetermined transmission optical power by the optical amplifier 30 provided at a rear stage (post-stage) of the multiplexer 12.

The WDM optical signal transmitted to the optical transmission line 20 is received by the optical transmission apparatus 10-2. The optical transmission apparatus 10-2 includes, for example, a wavelength demultiplexer (DMUX) 15 and a plurality of transponders 16. At a front stage (pre-stage) of the demultiplexer 15, the optical amplifier (pre-amplifier) 30 may be provided for amplifying the WDM optical signal received from the optical transmission line 20.

The demultiplexer 15 de-multiplexes the WDM optical signal input from the optical transmission line 20 for each wavelength and inputs the de-multiplexed signal to any one of the transponders 16. Meanwhile, in the case of a coherent reception in the transponders 16, the demultiplexer 15 may alternatively be an optical splitter that splits the WDM optical signal. The optical splitter may be a branched coupler.

Each of the transponders 16 photoelectrically converts an optical signal input from the demultiplexer 15 into an electrical signal, and transmits the electrical signal to a communication device 50 such as a router or the like. The communication device 50 is, for example, a communication device 50 on the client side.

Meanwhile, although a configuration focusing on the communication in a direction from the optical transmission apparatus 10-1 toward the optical transmission apparatus 10-2 has been illustrated in FIG. 1, the same configuration may be employed for the communication in a reverse direction as well. In other words, a bidirectional communication may be carried out between the optical transmission apparatus 10-1 and the optical transmission apparatus 10-2 (e.g., between the communication device 40 and the communication device 50).

The bidirectional communication may be carried out via the optical transmission line 20 provided separately for each of both directions between the optical transmission apparatus 10-1 and the optical transmission apparatus 10-2. For example, a reverse communication from the optical transmission apparatus 10-2 to the optical transmission apparatus 10-1 may be regarded as being implemented by a configuration in which, in FIG. 1, the optical transmission apparatus 10-1 and the optical transmission apparatus 10-2 are replaced with each other.

In the bidirectional communication, a direction in which the optical transmission apparatus 10-1 (or 10-2) transmits a WDM optical signal to the optical transmission line 20 is called an "upstream direction," and a reverse direction, i.e., a direction in which the optical transmission apparatus 10-1 (or 10-2) receives a WDM optical signal from the optical transmission line 20, is called a "downstream direction."

Therefore, each of the optical transmission apparatuses 10-1 and 10-2 may include a transmitting system corresponding to the upstream direction and a receiving system corresponding to the downstream direction. For example, in FIG. 1, the transponders 11 and the multiplexer 12 correspond to the transmitting system of the optical transmission apparatus 10-1, and the demultiplexer 15 and the transponders 16 correspond to the receiving system of the optical transmission apparatus 10-2.

In other words, it may be considered that the optical transmission apparatus 10-1 includes, although not illustrated in FIG. 1, as a receiving system, the demultiplexer 15 and the transponders 16, similarly to the receiving system of the optical transmission apparatus 10-2. Further, it may be considered that the optical transmission apparatus 10-2 includes, although not illustrated in FIG. 1, as a transmitting system, the transponders 11 and the multiplexer 12, similarly to the transmitting system of the optical transmission apparatus 10-1. However, the transponders 11 (or transponders 16) may be commonly used both for transmission and reception. In other words, the transponders 11 and 16 may have the same configuration (transmitting and receiving sections).

Figure 2:
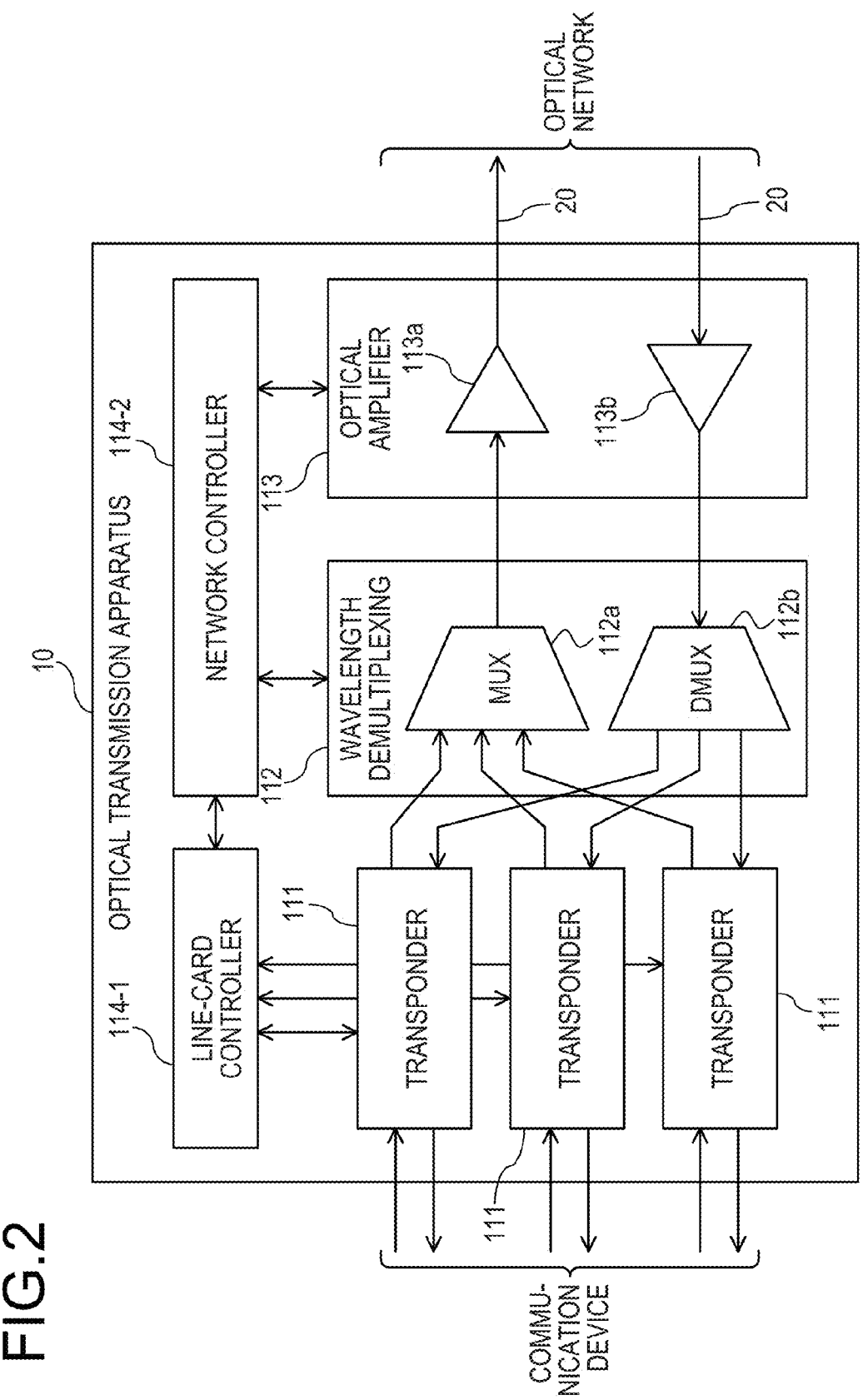
FIG. 2 is a block diagram illustrating an exemplary configuration of an optical transmission apparatus illustrated in FIG. 1.

FIG. 2 illustrates an exemplary configuration of the optical transmission apparatus 10 supporting a bidirectional communication. The optical transmission apparatus 10 illustrated in FIG. 2 includes, for example, a plurality of transponders 111, a wavelength demultiplexing block 112, an optical amplifier block 113, a line-card controller 114-1, and a network controller 114-2. Meanwhile, the "block" may be referred to as a "module."

Each of the transponders 111 corresponds to the transponder 11 (or 16) illustrated in FIG. 1. By way of example, each of the transponders 111 is optically connected to the communication device 40 (or 50) such as a router to enable a bidirectional communication, and can transmit and receive an optical signal to and from the communication device 40 (or 50).

Each of the transponders 111 may be regarded as an element of an "optical transmitter" of the optical transmission apparatus 10, and may be regarded as an element of an "optical receiver" of the optical transmission apparatus 10.

The wavelength demultiplexing block 112 includes, for example, a multiplexer (MUX) 112a corresponding to the upstream direction, and a demultiplexer (DMUX) 112b corresponding to the downstream direction. It may be understood that the multiplexer 112a is equivalent to the multiplexer 12 illustrated in FIG. 1, and the demultiplexer 112b is equivalent to the demultiplexer 15 illustrated in FIG. 1.

An output port (a transmission port) of each of the transponders 111 is optically connected to an input port of the multiplexer 112a using an optical fiber or the like. Further, an input port (reception port) of each of the transponders 111 is optically connected to any one of output ports of the demultiplexer 112b using an optical fiber or the like.

Thus, the multiplexer 112a generates a WDM optical signal by wavelength-multiplexing an optical signal transmitted from the transmission port of each of the transponders 111. Further, the demultiplexer 112b de-multiplexes the WDM optical signal received from the optical amplifier block 113 for each wavelength and inputs the de-multiplexed signal to the reception port of each of the transponders 111.

The optical amplifier block 113 includes an optical amplifier 113a corresponding to the upstream direction, and an optical amplifier 113b corresponding to the downstream direction. The optical amplifier 113a amplifies the WDM optical signal input from the multiplexer 112a with a predetermined transmission power, and transmits the amplified signal to the optical transmission line 20. The optical amplifier 113b amplifies the WDM optical signal received from the optical transmission line 20 with a predetermined reception power, and inputs the amplified signal to the demultiplexer 112b.

In some cases, the optical amplifier block 113 may be unnecessary depending on the transmission distance of the WDM optical signal.

The line-card controller 114-1 is electrically or optically connected to each of the transponders 111 and performs a switching processing according to the destination of data received by the line-card controller 114-1. Thus, the "line-card controller" may be referred to as a "switching part" or a "switching board." The switched data is transmitted, via each of the transponders 111, to the side of the communication device 40 or the optical transmission line 20 (optical network).

The network controller 114-2 collectively controls the operations of the line-card controller 114-1, the wavelength demultiplexing block 112 and the optical amplifier block 113. The line-card controller 114-1 and the network controller 114-2 may be integrated as a single controller. If the line-card controller 114-1 and the network controller 114-2 may not be distinguished from each other, the line-card controller 114-1 or the network controller 114-2 may be simply referred to as a "controller 114."

Figure 3:
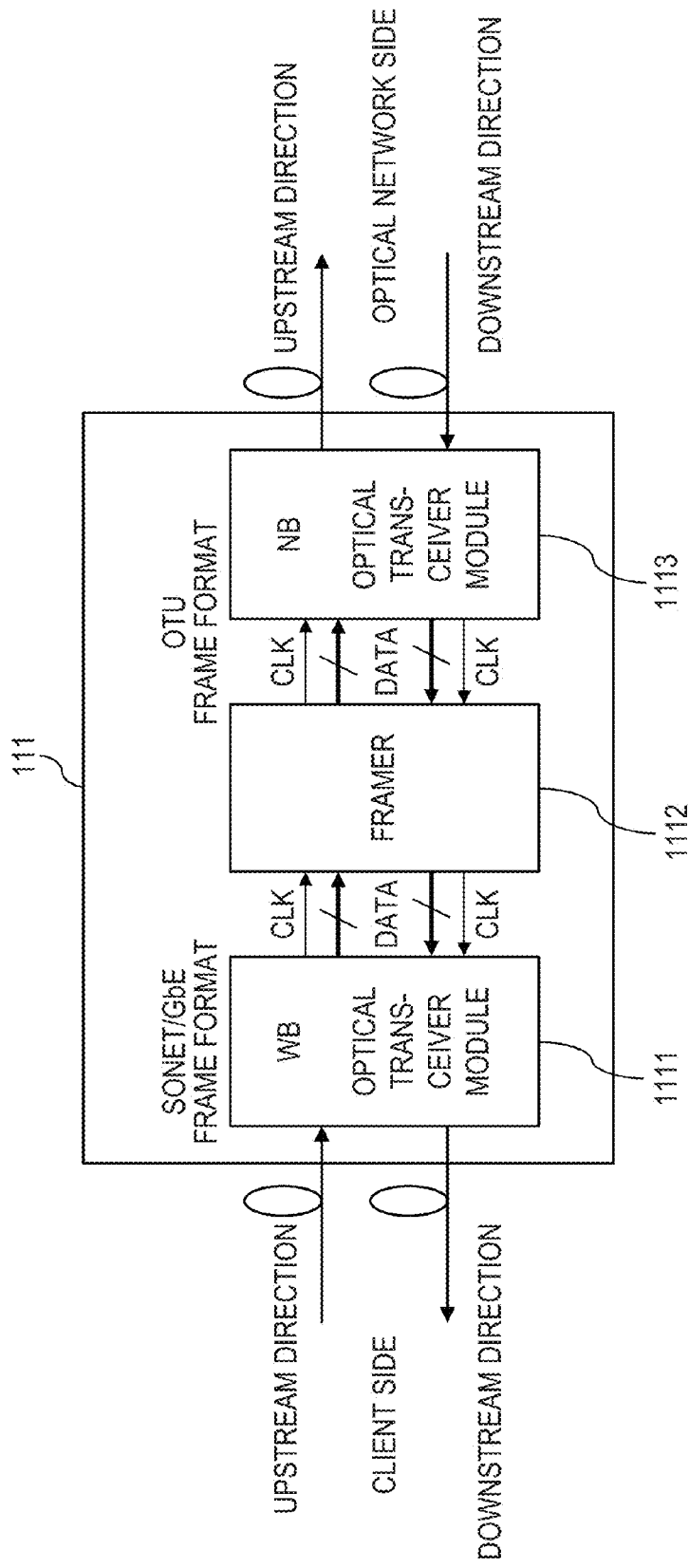
FIG. 3 is a block diagram illustrating an exemplary configuration of a transponder illustrated in FIG. 2.

FIG. 3 illustrates an exemplary configuration of the transponder 111 illustrated in FIG. 2. By way of example, the transponder 111 includes a wideband (WB) optical transceiver module 1111, a framer 1112, and a narrowband (NB) optical transceiver module 1113. The "optical transceiver module" may be referred to as "optical transceiver."

By way of example, the WB optical transceiver module 1111 transmits and receives a signal to and from the client-side communication device 40 (or 50) such as a router by using wideband light (hereinafter sometimes referred to as "WB light"). The signal transmitted and received by the WB light may be, for example, a frame signal used in synchronous optical network (SONET), Ethernet (registered trademark) or the like.

For example, the WB optical transceiver module 1111 converts the WB light received from the communication device 40 (or 50) into an electrical signal and inputs the electrical signal to the framer 1112. Further, the WB optical transceiver module 1111 converts the electrical signal received from the framer 1112 into WB light, and transmits the WB light to the communication device 40 (or 50).

By way of example, the framer 1112 maps the signal photoelectrically converted by the WB optical transceiver module 1111 to, for example, an optical channel transport unit (OTU) frame signal and inputs the OTU frame signal to the NB optical transceiver module 1113. Further, the framer 1112 demaps the frame signal of the SONET, Ethernet (registered trademark) or the like to be input to the WB optical transceiver module 1111. The frame signal is mapped to the OTU frame signal from the NB optical transceiver module 1113. The processing of the frame signal may include a process of adding such an error correcting code.

By way of example, the NB optical transceiver module 1113 transmits and receives a frame signal (e.g., OTN frame signal) to and from the optical transmission line 20 by using narrowband light (hereinafter sometimes referred to as "NB light").

For example, the NB optical transceiver module 1113 converts the OTU frame signal of the electrical signal, generated by the framer 1112, into NB light, and outputs the NB light to the multiplexer 112*a* illustrated in FIG. 2. Further, the NB optical transceiver module 1113 converts, for example, the OTN frame signal input as the NB light from the demultiplexer 112*b* illustrated in FIG. 2 into an electrical signal, and outputs the electrical signal to the framer 1112.

As described above, the transponder 111 enables a bidirectional communication between the communication device 40 and the communication device 50 through the conversion process of the light and the frame signal to be transmitted and received between the tributary side and the network (optical transmission line 20) side.

Meanwhile, in the optical transmission technology, for an even larger capacity, in addition to the WDM technology, the use of a technique called "Super Channel" is being considered and discussed. In the previous WDM technology, a wavelength spacing has been set such that an inter-channel interference can be suppressed sufficiently. For example, as illustrated in FIG. 4A, in the case of the optical signal of 100 Gbps per channel, channels may be arranged at a spacing of about 50 GHz in the WDM optical signal.

In contrast, in the super-channel technology, by using a spectrum shaping processing through digital signal processing, it is possible to further narrow a channel spacing while suppressing the inter-channel interference. For example, by performing a convolution processing of a main signal (e.g., NRZ signal) by using a filter such as a raised cosine filter that exhibits a time response in a Sinc function shape, the frequency spectrum of the main signal light can be narrowed and shaped into a rectangular shape.

Thus, in the case of the optical signal of 100 Gbps per channel, for example, as illustrated in FIG. 4B, the channel spacing in the WDM optical signal can be approximated to a spacing narrower than 50 GHz (e.g., about 36 GHz).

Meanwhile, in a case where a variation (which may be referred to as a "fluctuation") occurs in the emission wavelength of a transmission light source (e.g., a laser diode LD), a margin may be set in the channel spacing in consideration of the fluctuation. For example, in a case where the emission wavelength of the LD varies in a certain frequency range (e.g., ±1.5 GHz) due to environmental conditions or a temporal change or the like, the frequency range may be set as the margin of the channel spacing. The variation of the emission wavelength of the LD may be referred to as End Of Life (EOL) variation.

If a frequency bandwidth per channel could be narrowed to 32 GHz by spectrum shaping processing, the frequency bandwidth per channel becomes 35 GHz considering a margin of ±1.5 GHz (3 GHz) as EOL variation. Thus, when each channel is arranged such that a guard band of 1 GHz is sandwiched between channels, the channel spacing becomes 36 GHz.

Here, it is assumed that multiple channels are arranged (multiplexed) in a certain frequency band such as, for example, a transmission band of a wavelength selection switch (WSS) through which the WDM optical signal passes (may be referred to as a "frequency grid"). Meanwhile, the WSS is an example of an optical device used in the optical transmission apparatus 10, and its transmission band is an example of a parameter which affects the transmission characteristics such as the band characteristics of the WDM optical signal.

In the transmission band of the WSS, a difference between a frequency corresponding to an edge of the transmission band and a frequency corresponding to an edge of the channel closest to the frequency may be referred to as an "outer peripheral margin." If a large outer peripheral margin is ensured, it is possible to suppress a degradation of the transmission characteristics in the multi-span transmission of the WDM optical signal.

Figure 5:
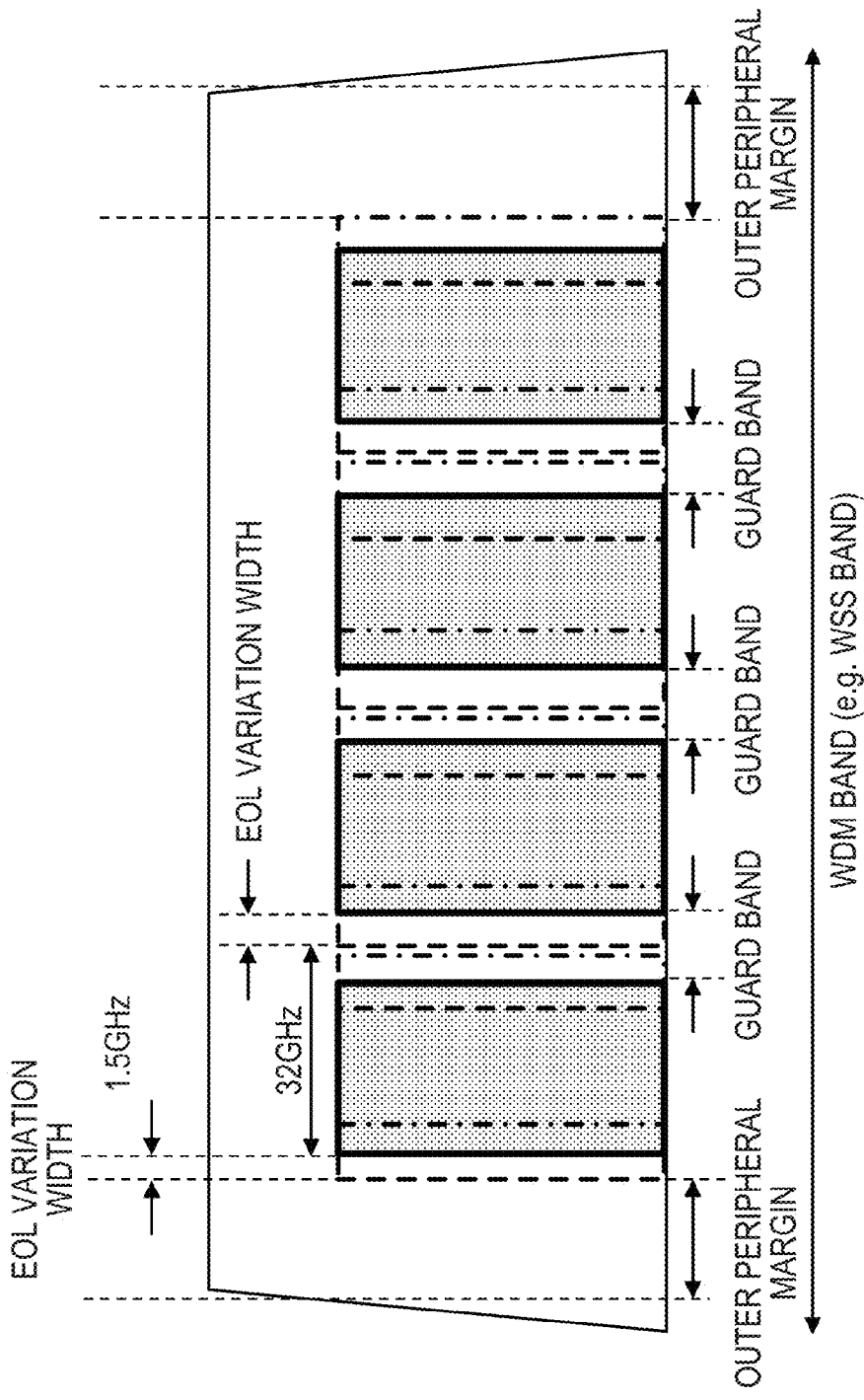
FIG. 5 is a view explaining an outer peripheral margin that can be ensured when transmission wavelength control is not performed in the channel arrangement illustrated in FIG. 4B.

As a non-limiting example, as illustrated in FIG. 5, assuming that four channels are multiplexed in the frequency grid of 162.5 GHz, a margin of about 7.5 GHz is ensured as the outer peripheral margin.

However, the margin of this degree may lead to a non-negligible increase in degradation of the transmission characteristics in the multi-span transmission. In addition, the frequency utilization efficiency in this case only increases by about 23.1% as compared to the case of a channel spacing of 50 GHz in the conventional WDM transmission illustrated in FIG. 4A.

In order to practically realize the super-channel, it is desired to improve the transmission characteristics by ensuring the outer peripheral margin having a larger width. Alternatively, for an even larger-capacity transmission, it is desired to further improve the frequency utilization efficiency.

Therefore, for example, by adaptively controlling the emission wavelength of the transmission LD during the operation of the optical network or the optical transmission apparatus, it may be considered that the outer peripheral margin that is ensured may be expanded by suppressing the fluctuation of the emission wavelength of the transmission LD.

In the channel arrangement of the super-channel illustrated in FIG. 5, if the wavelength control of the transmission LD is not implemented, as a variation of the transmission LD, it is required to consider the variation of four channels in a lateral direction (a total of eight locations) as a margin.

Figure 6:
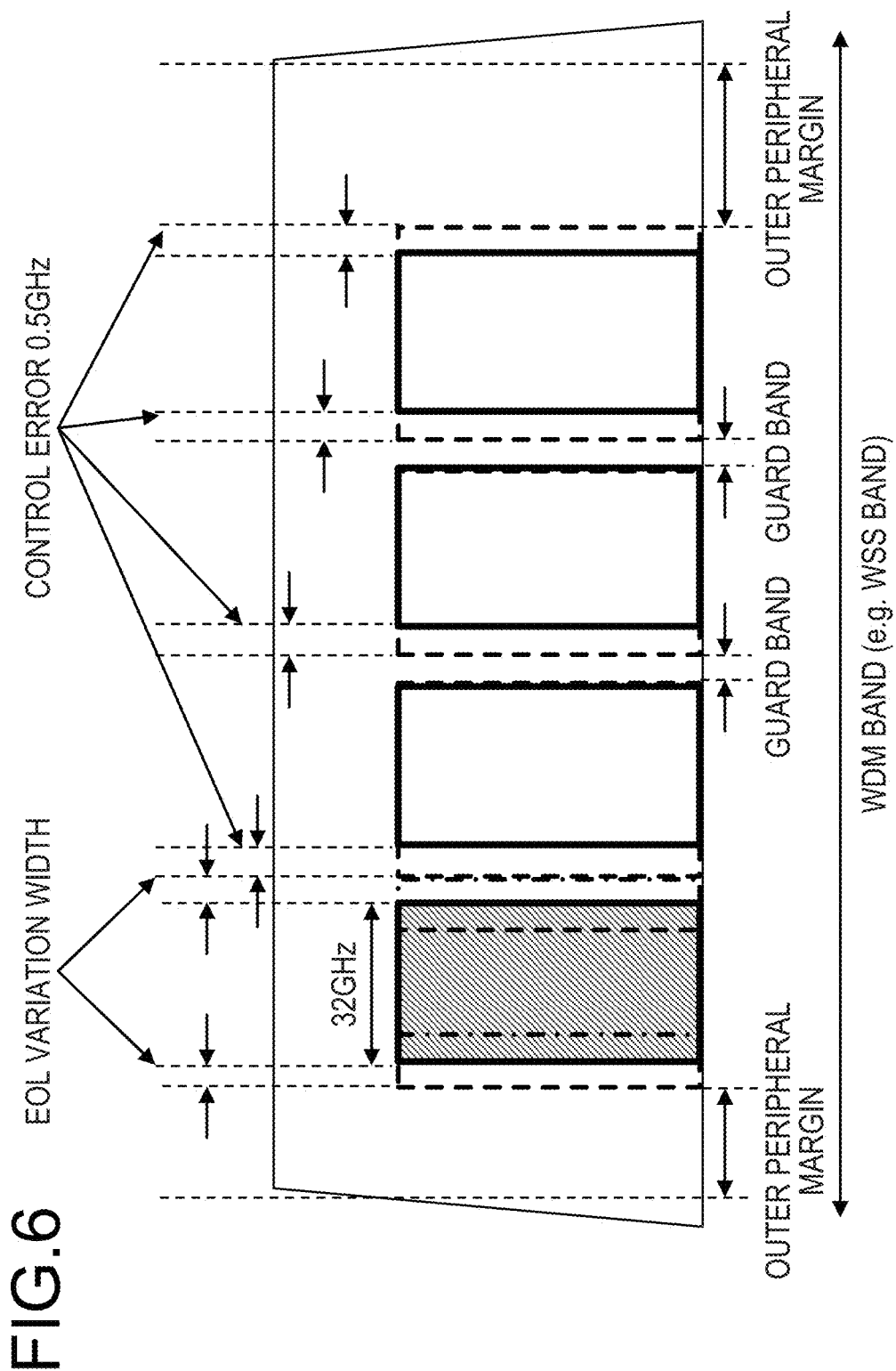
FIG. 6 is a view explaining an outer peripheral margin that can be ensured when transmission wavelength control is performed in the channel arrangement illustrated in FIG. 4B.

In contrast, for example, as illustrated in FIG. 6, if the wavelength control of the transmission LD is implemented using one channel among four channels as a reference channel, the variation of the other three channels may not be expected to be considered as a margin. Meanwhile, the reference channel is a channel outside the scope of channels for the wavelength control. In other words, only the variation for the reference channel among the four channels may be expected to be considered as a margin. However, a wavelength control error (e.g., about 500 MHz) may be expected to be considered.

By implementing the wavelength control, for example, as represented in Example 1 in Table 1 below, it is possible to ensure about 11 GHz as the outer peripheral margin, thereby suppressing the degradation of the transmission characteristics in the multi-span transmission.

TABLE 1

Specific example of channel arrangement

| | Wavelength not controlled | Wavelength controlled (Example 1) | Wavelength controlled (Example 2) |
|---|---|---|---|
| Required band | 162.5 GHz | 162.5 GHz | 150.0 GHz |
| Number of channels | 4 CH | 4 CH | 4 CH |
| Band utilization efficiency (compared to conventional) | 23.1% | 23.1% | 33.3% |
| Signal band | 32.0 GHz ×4 | 32.0 GHz ×4 | 32.0 GHz ×4 |
| Light source variation | 1.5 GHz ×8 | 1.5 GHz ×2 | 1.5 GHz ×2 |
| Light source control error | 0.5 GHz ×0 | 0.5 GHz ×4 | 0.5 GHz ×4 |
| Guard band between channels | 2.5 GHz ×3 | 2.5 GHz ×3 | 2.5 GHz ×3 |
| Outer peripheral margin | 7.5 GHz ×2 | 11.0 GHz ×2 | 4.8 GHz ×2 |

Alternatively, as represented in Example 2 in Table 1, although the outer peripheral margin that can be ensured is smaller than that in Example 1, it becomes practically possible to multiplex four channels with a grid of 150.0 GHz. In Example 2, it is possible to greatly improve the frequency utilization efficiency (e.g., 33.3%) as compared to 23.1% in Example 1.

Next, a transmission signal and a reception signal of the super-channel will be described with reference to FIG. 7. Each of transmitters A1, B1 and C1 illustrated on the upper left of FIG. 7 may be regarded as being equivalent to, for example, a transmitter in the upstream direction provided in the NB optical transceiver module 1113 of the transponders 111 illustrated in FIGS. 2 and 3.

Figure 7:
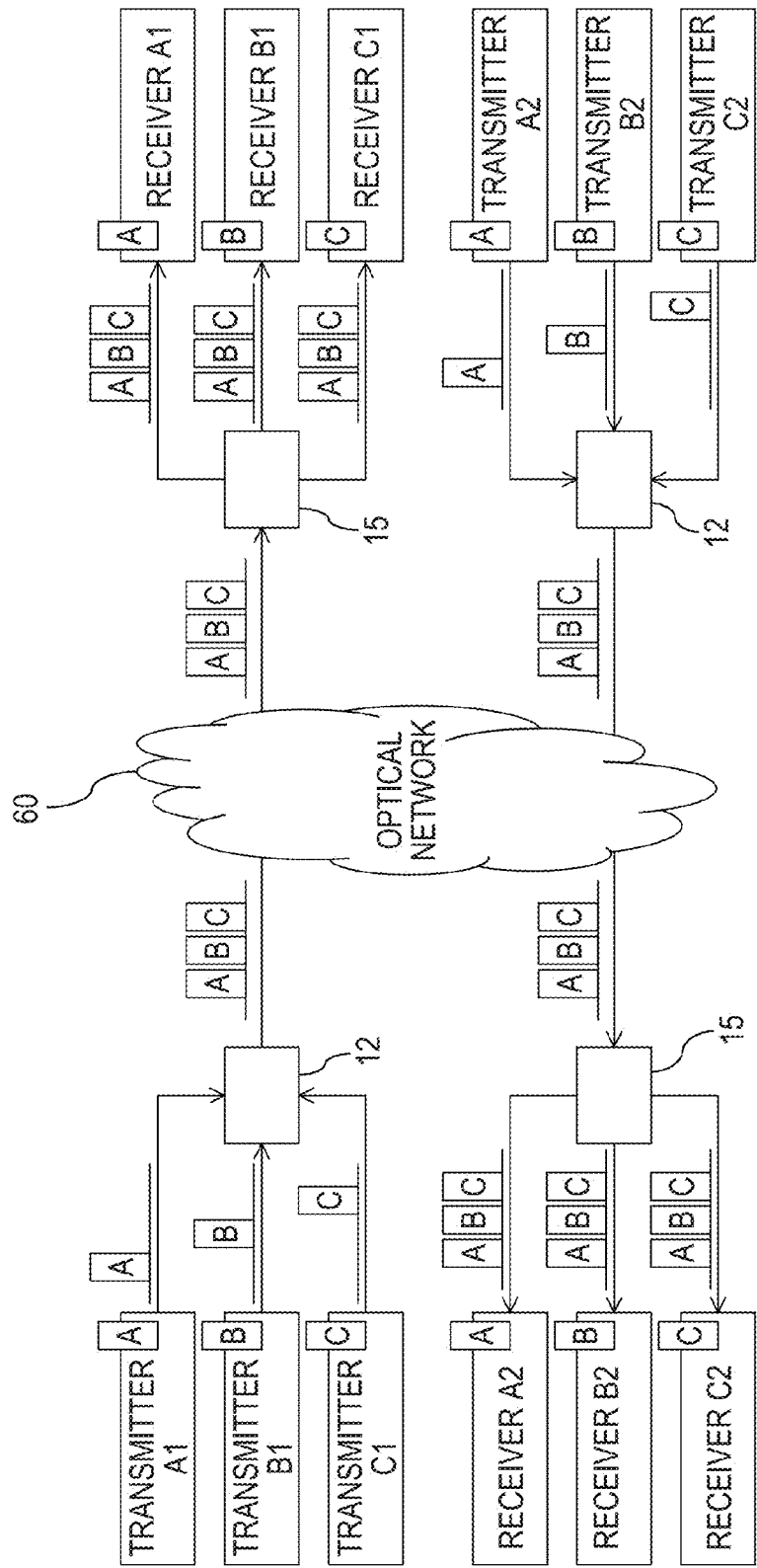
FIG. 7 is a block diagram explaining a multi-channel reception in the optical transmission system illustrated in FIG. 1.

In addition, each of receivers A1, B1 and C1 illustrated on the upper right of FIG. 7 may be regarded as being equivalent to, for example, a receiver in the downstream direction provided in the NB optical transceiver module 1113 of the transponders 111 illustrated in FIGS. 2 and 3.

Furthermore, each of transmitters A2, B2 and C2 illustrated on the lower right of FIG. 7 may be regarded as being equivalent to, for example, a transmitter in the upstream direction provided in the NB optical transceiver module 1113 of the transponders 111 illustrated in FIGS. 2 and 3.

In addition, each of receivers A2, B2 and C2 illustrated on the lower left of FIG. 7 may be regarded as being equivalent to, for example, a receiver in the downstream direction provided in the NB optical transceiver module 1113 of the transponders 111 illustrated in FIGS. 2 and 3.

Optical signals A to C transmitted from the transmitters A1, B1 and C1 (A2, B2, and C2), respectively, are wavelength-multiplexed into a WDM optical signal forming a super-channel in the aforementioned multiplexer 12 and transmitted to an optical network 60.

Meanwhile, the optical signals A to C may be regarded, respectively, as optical signals having wavelengths corresponding to emission wavelengths $\lambda_A$ to $\lambda_C$ of the transmission light sources of the transmitters A1, B1 and C1 (A2, B2 and C2). The wavelengths $\lambda_A$ to $\lambda_C$ forming the super-channel may be referred to as "sub-channels" or "sub-carriers". Further, the optical network 60 may be regarded as a concept including the optical transmission line 20 and the optical amplifier 30 illustrated in FIG. 1.

The transmission signal (WDM optical signal) of the super-channel transmitted to the optical network 60 is demultiplexed by the demultiplexer 15 described above into the number of branches corresponding to the number of the receivers A1, B1 and C1 (A2, B2 and C2) and input to the receivers A1, B1 and C1 (A2, B2 and C2), respectively.

In other words, the receivers A1, B1 and C1 (A2, B2 and C2) receive the same WDM optical signal into which the optical signals A to C are wavelength-multiplexed, respectively. This reception may be referred to as a "multi-channel reception" or a "multi-carrier reception."

Each of the receivers A1, B1 and C1 (A2, B2 and C2) includes a local oscillation light source (e.g., LD) used in the coherent reception. The emission wavelength of the local oscillation light source is consistent with the emission wavelength of the corresponding transmission source of each of the transmitters A1, B1 and C1 (A2, B2 and C2). In the following description, the emission wavelength of the transmission light source may be referred to as a "transmission wavelength," and the emission wavelength of the local oscillation light source may be referred to as a "reception wavelength".

For example, the reception wavelength of the receiver A1 (A2) is consistent with the transmission wavelength $\lambda_A$ of the transmitter A1 (A2), and the reception wavelength of the receiver B1 (B2) is consistent with the transmission wavelength $\lambda_B$ of the transmitter B1 (B2). Similarly, the reception wavelength of the receiver C1 (C2) is consistent with the transmission wavelength $\lambda_C$ of the transmitter C1 (C2).

Meanwhile, in this example, the wavelengths of the optical signals transmitted from the transmitters A1, B1 and C1 to the receivers A1, B1 and C1 are consistent with the wavelengths of the optical signals transmitted in the reverse direction from the transmitters A2, B2 and C2 to the receivers A2, B2 and C2, respectively, but may be different.

The receiver A1 (A2) extracts and receives a signal of the transmission wavelength $\lambda_A$ of the transmitter A1 (A2) from the WDM optical signal branched and input from the demultiplexer 15. The receiver B1 (B2) extracts and receives a signal of the transmission wavelength $\lambda_B$ of the transmitter B1 (B2) from the WDM optical signal. Similarly, the receiver C1 (C2) extracts and receives a signal of the transmission wavelength $\lambda_C$ of the transmitter C1 (C2) from the WDM optical signal.

However, because adjacent channels are close to the WDM optical signal of the super-channel, a part of signal components of the adjacent channels may be included (or may "remain") in the received signals at the receivers A1, B1 and C1 (A2, B2 and C2).

For example, at the receiver A1 (A2), a part of signal components of the adjacent channel (wavelength $\lambda_B$) may be included in the received signal. At the receiver B1 (B2), a part of signal components of the adjacent channels (wavelengths $\lambda_A$ and $\lambda_C$) may be included in the received signal. At the receiver C1 (C2), a part of signal components of the adjacent channel (wavelength $\lambda_B$) may be included in the received signal.

Figure 8:
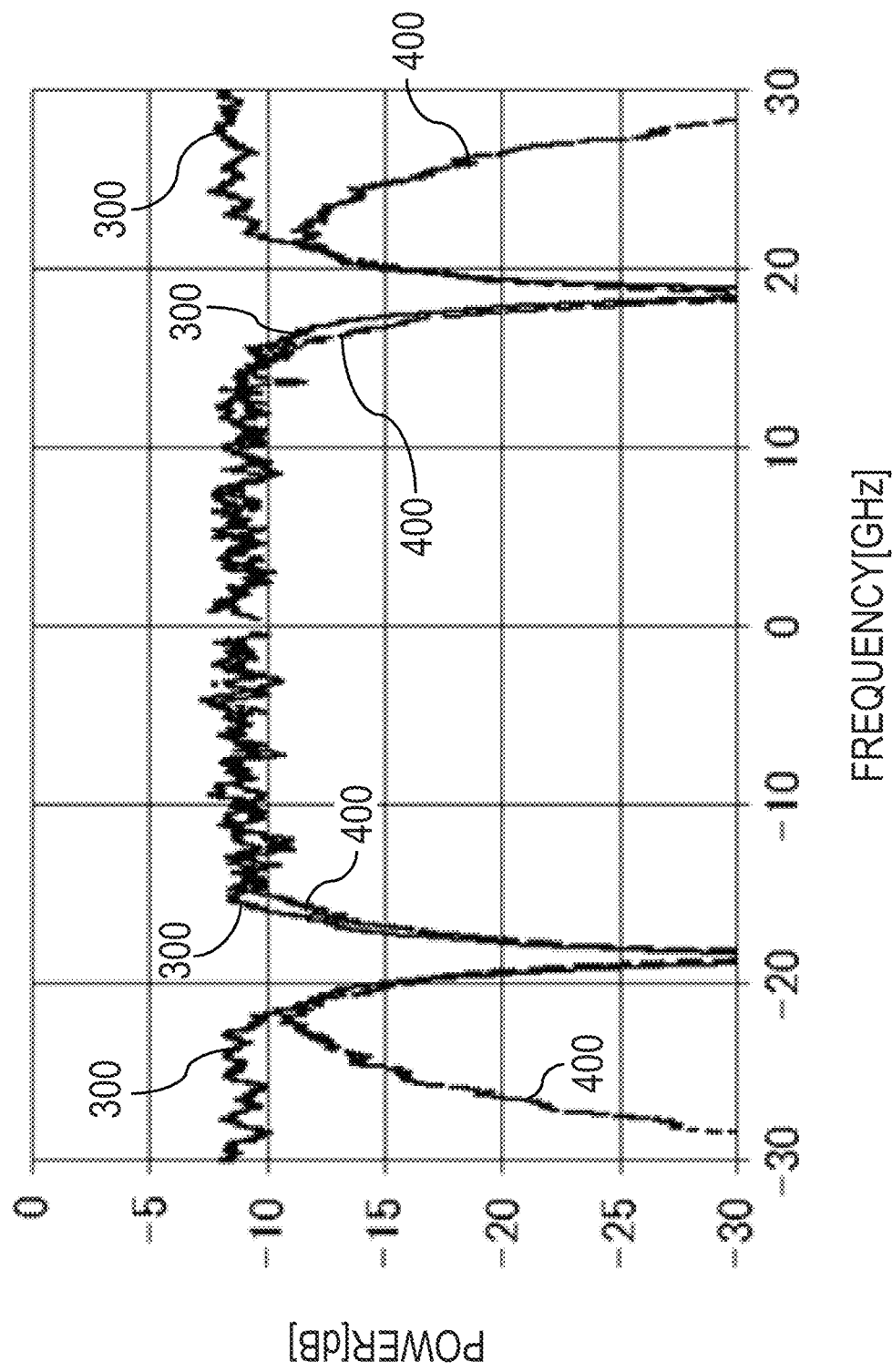
FIG. 8 is a diagram illustrating an example of a spectrum of each of a transmission signal and a reception signal in the optical transmission system illustrated in FIG. 7.

FIG. 8 illustrates examples of the spectrum (see, e.g., reference numeral 300) of the transmission signal of the super-channel (after wavelength multiplexing) and the spectrum (see, e.g., reference numeral 400) of the reception signal obtained by the digital signal processing at the receiver.

FIG. 8 is an example of the spectrum of the received signal, at the receiver, and illustrates the spectrum at the time of sampling the transmission signal of the super-channel by Analogue to Digital Converter (ADC) with a sampling frequency equivalent to a twice oversampling. The transmission signal of the super-channel is, for example, a signal whose baud rate is 32 gigabaud (Gbaud).

As illustrated in FIG. 8, the spectrum of the reception signal may include not only the spectrum having, as a center frequency, a frequency corresponding to the wavelength of the local oscillation light source, but also the signal component spectrum of the adjacent channel at one or both of the low frequency side and high frequency side with respect to the spectrum.

Hereinafter, a method for controlling the transmission wavelength of the transmitter in the configuration illustrated in FIG. 7 will be described. For example, it is assumed that if the transmission wavelength of the transmitter B2 is not present at an expected position as compared to the transmission wavelengths of the transmitter A2 and the transmitter C2, the wavelength position is controlled.

Figure 9:
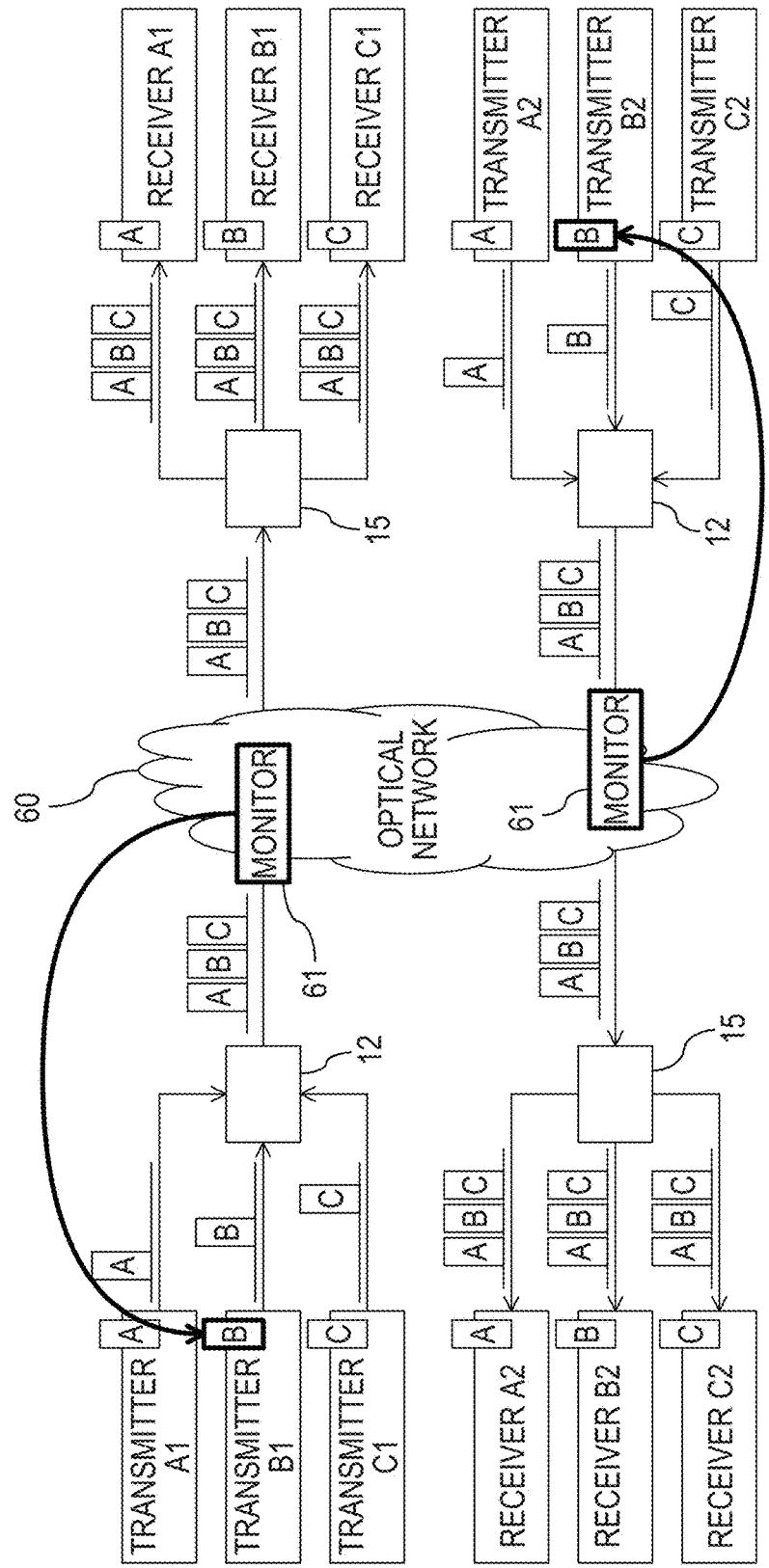
FIG. 9 is a block diagram illustrating an exemplary configuration in which channel spacing monitoring is applied to the optical transmission system illustrated in FIG. 7.

FIG. 9 illustrates an example of a wavelength control method when it was possible to monitor the channel spacing based on the transmission signal after being wavelength-multiplexed by the multiplexer 12. FIG. 9 illustrates a state in which a monitor 61 is installed in the element (e.g., NE such as an optical relay node or ROADM) of the optical network 60 and the transmission signal after wavelength multiplexing is monitored by the monitor 61.

If the channel spacing of the transmission signal can be monitored by the monitor 61, it is possible to detect the transmission wavelength (e.g., $\lambda_B$) which is absent at an expected wavelength position. By feeding the detection result back to the corresponding transmitter (e.g., the transmitters B1 and B2), it is possible to control the transmission wavelength $\lambda_B$ to move to the original expected wavelength position.

However, this method requires work and cost to add the monitor 61 to the optical network 60. Further, a control signal path for feeding the monitored channel spacing back to the transmitter is added. Thus, the method of monitoring the channel spacing in the optical network 60 has a large influence on the cost, which may be a significant barrier in terms of introduction.

Figure 10:
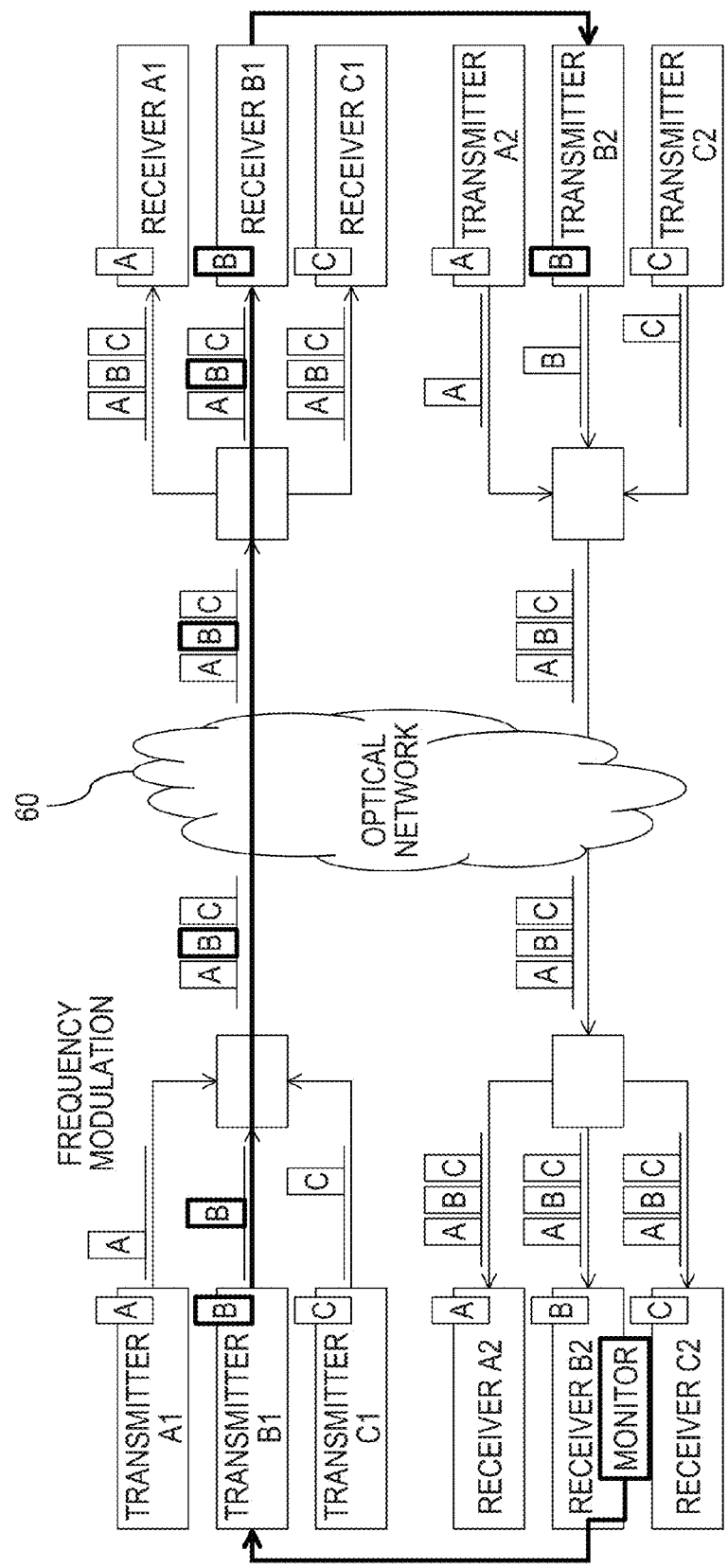
FIG. 10 is a block diagram illustrating an aspect in which the monitoring result of the channel spacing is superimposed on the signal transmitted to the opposite side, as a frequency modulation component, in the optical transmission system illustrated in FIG. 7.

In contrast, for example, as illustrated in FIG. 10, if the channel spacing can be monitored by the receiver B2, a shift of the transmission wavelength of the opposing transmitter B2 can be detected (or "measured") by the receiver B2.

Then, if the detection result (or wavelength control information according to the detection result) is notified, for example, to the receiver B2 through the receiver B1 from the transmitter B1, it is possible to perform a control of minimizing the shift of the transmission wavelength of the transmitter B2.

By way of example, the notification may be performed by modulating the frequency of transmission light of the transmitter B1 and superimposing notification information (wavelength shift detection result or wavelength control information) on the transmission light. The notification information may be regarded as an example of supervisory control information. The transmission light on which the supervisory control information is superimposed may be regarded as light including a supervisory (SV) optical component or an optical supervisory channel (OSC) component.

The receiver B1 demodulates and detects the control notification information superimposed on the reception signal by the frequency modulation. By controlling the transmission wavelength of the transmitter B2 based on the detected notification information, it is possible to compensate the transmission wavelength shift of the transmitter B2. Meanwhile, the transmission wavelength shift of the transmitters A2 and C2 or the transmission wavelength shift of the transmitters A1, B1 and C1 also can be compensated by feeding the monitoring result at the receiver back to the corresponding transmitter in the same manner as described above.

Here, a set of the receiver B2 and the transmitter B1 may be regarded as being included in, for example, one transponder 111 illustrated in FIG. 2. Similarly, a set of the receiver B1 and the transmitter B2 also may be regarded as being included in one transponder 111 illustrated in FIG. 2 of another node.

Thus, the transmission and reception of information between the receiver B2 (B1) and the transmitter B1 (B2) in the same transponder 111 are easy, and the control of the transmission wavelength shift of the transmitter B2 (B1) also can be easily realized. For example, the control of the transmission wavelength shift may be implemented by the controller 114 illustrated in FIG. 2, or a controller (not illustrated in FIG. 2) incorporated in the transponder 111.

Thus, if it is possible to monitor the channel spacing by the receiver, it is possible to realize the wavelength control at low cost without adding a monitor and a control signal path to the optical network 60.

Figure 11:
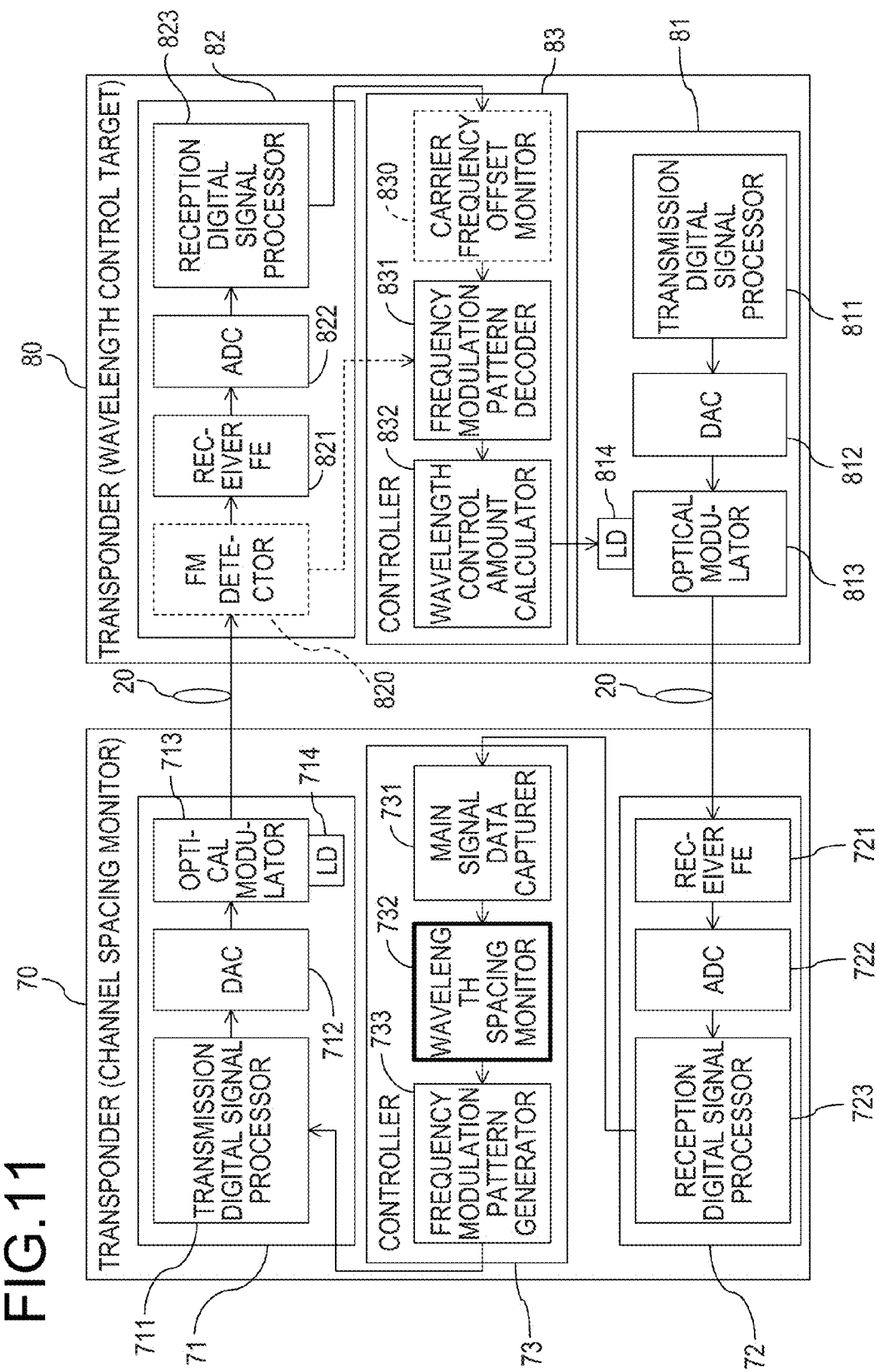
FIG. 11 is a block diagram illustrating an exemplary configuration of a transponder illustrated in FIGS. 1 to 3.

Next, FIG. 11 illustrates an exemplary configuration of the transponder to realize the wavelength control of the transmission light source as described above. The transponders 70 and 80 illustrated in FIG. 11 are connected, for example, via the aforementioned optical transmission line 20 (i.e., the optical network 60) to enable bidirectional optical communication. The transponders 70 and 80 illustrated in FIG. 11 may be regarded as being equivalent to the NB optical transceiver module 1113 illustrated in FIG. 3.

One transponder 70 is equivalent to, for example, one of the transponders 111 of FIG. 2 provided in the optical transmission apparatus 10-1 of FIG. 1, and also may be regarded as being equivalent to a transponder including the receiver B2 illustrated in FIG. 10. Therefore, the transponder 70 may be regarded as being equivalent to a transponder having a function of monitoring the channel spacing described with reference to FIG. 10. Thus, hereinafter, the transponder 70 may be referred to as "monitor transponder 70" for the sake of convenience.

The other transponder 80 is equivalent to, for example, one of the transponders 111 of FIG. 2 provided in the optical transmission apparatus 10-2 of FIG. 1, and also may be regarded as being equivalent to the transponder 70 including the transmitter B2 illustrated in FIG. 10. Therefore, the transponder 80 may be regarded as being equivalent to a transponder whose transmission wavelength is controlled on the basis of the channel spacing monitoring result described with reference to FIG. 10. Thus, hereinafter, the transponder 80 may be referred to as "wavelength control target transponder 80" for the sake of convenience.

The optical transmission apparatus 10-2 provided with the wavelength control target transponder 80 may be regarded as an example of a first optical transmission apparatus for transmitting, as a WDM optical signal, a plurality of transmission signals whose waveform (spectrum) is shaped by using digital signal processing.

In contrast, the optical transmission apparatus 10-1 provided with the monitor transponder 70 may be regarded as an example of a second optical transmission apparatus for receiving the WDM optical signal transmitted from the optical transmission apparatus 10-2 in a digital coherent manner.

The monitor transponder 70 includes, for example, a transmitter 71, a receiver 72 and a controller 73. The transmitter 71 may be regarded as being equivalent to the transmitter B1 illustrated in FIG. 10, and the receiver 72 may be regarded as being equivalent to the receiver B2 illustrated in FIG. 10.

The transmitter 71 includes, for example, a transmission digital signal processor 711, a Digital to Analogue Converter (DAC) 712, an optical modulator 713, and a transmission light source (e.g., LD) 714.

The transmission digital signal processor 711 performs digital signal processing such as spectrum shaping, carrier frequency control or nonlinear compensation on a transmission digital data signal.

The DAC 712 converts the transmission digital data signal which has been subjected to digital signal processing by the transmission digital signal processor 711 into an analog data signal. The analog data signal obtained by the DAC 712 is provided to the optical modulator 713 as a drive signal of the optical modulator 713.

The optical modulator 713 generates a transmission modulated signal light by modulating the output light of the transmission light source 714 by the drive signal provided from the DAC 712. The transmission modulated signal light is transmitted to the optical transmission line 20 leading to the opposing transponder 80. The transmission light source 714 may be a light source (e.g., tunable LD) whose emission wavelength is variable.

Further, in the carrier frequency control in the transmission digital signal processor 711, by performing the frequency control according to the above-described supervisory control information, it is possible to superimpose the supervisory control information on the transmission modulated signal light as a frequency modulation component.

Meanwhile, the receiver 72 is an example of a receiver for receiving the WDM optical signal in a digital coherent manner, and includes, for example, a receiver front-end (FE) 721, an ADC 722, and a reception digital signal processor 723.

By way of example, the receiver FE 721 includes the aforementioned local oscillation light source, or a photoelectric converter such as an optical phase hybrid and a photo detector (PD). By causing the output light of the local oscillation light source to interfere with the WDM optical signal received from the optical transmission line 20 in the same phase and different phases (e.g., 90-degree different phases) by an optical phase hybrid, it is possible to demodulate the signal light by measuring the electric field complex information of the signal light corresponding to a desired reception channel. The demodulated signal light is photoelectrically converted into an analog electrical signal by, for example, a PD and input to the ADC 722. The receiver FE 721 may be paraphrased as "receiver 721".

The ADC 722 converts the analog electrical signal of the signal light demodulated in the receiver FE 721 into a digital electrical signal and inputs the digital electrical signal to the reception digital signal processor 723.

The reception digital signal processor 723 performs digital signal processing on the digital electrical signal corresponding to the signal light demodulated in the receiver FE 721. The digital signal processing may include, for example, dispersion compensation, sampling phase synchronization, adaptive equalization, frequency offset compensation, carrier phase reconstruction and the like. The reception digital signal processor 723 can be achieved by using, for example, a digital signal processor (DSP), a field programmable gate array (FPGA), a large-scale integrated circuit (LSI) or the like.

Figure 12:
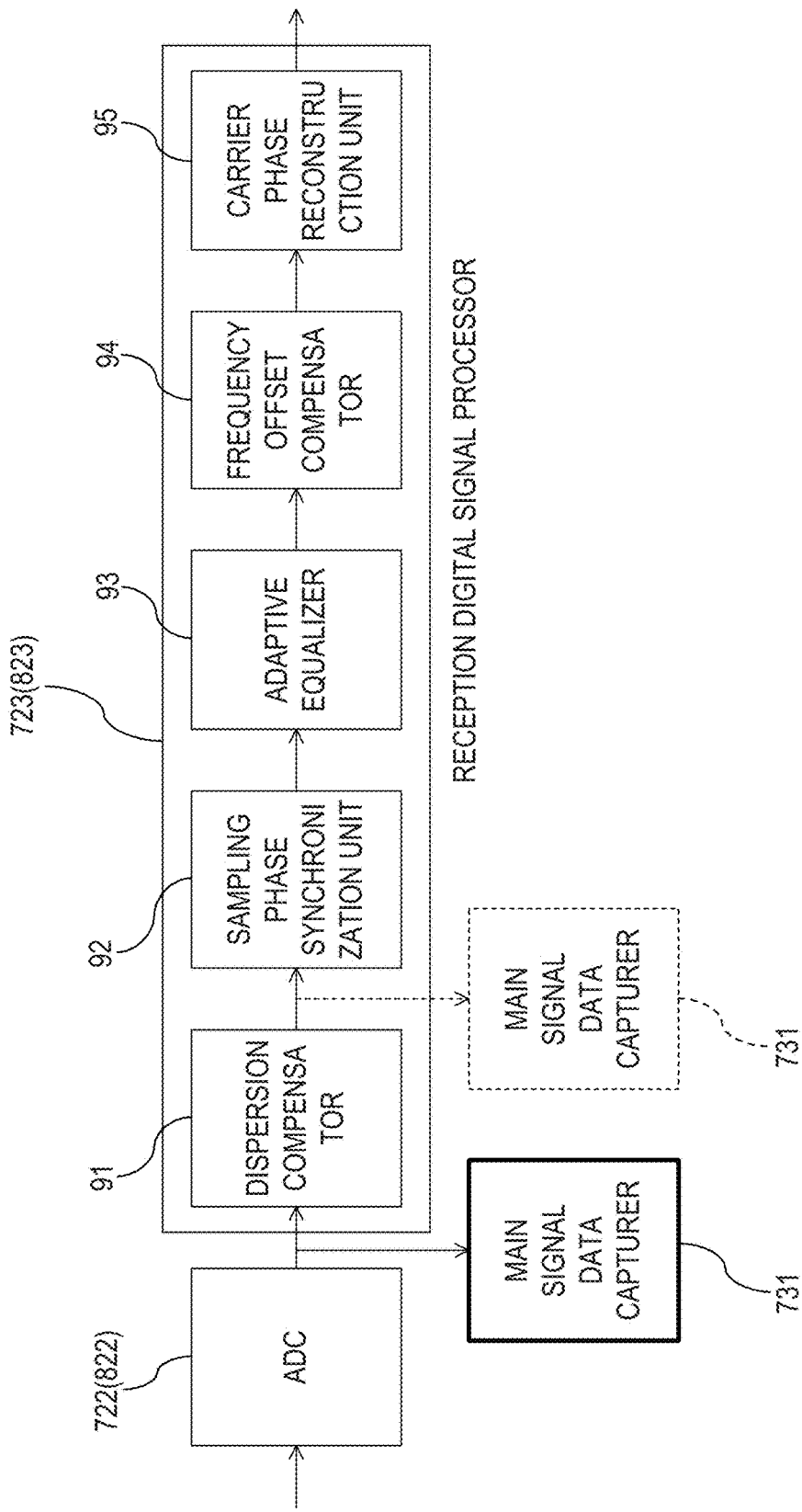
FIG. 12 is a block diagram illustrating an exemplary configuration of a reception digital signal processor illustrated in FIG. 11.

As a specific example, the reception digital signal processor 723 may include, for example, as illustrated in FIG. 12, a dispersion compensator 91, a sampling phase synchronization unit 92, an adaptive equalizer 93, a frequency offset compensator 94, and a carrier phase reconstruction unit 95. A reception digital signal processor 823 of the transponder 80 also may be identical or similar to the configuration of FIG. 12.

The dispersion compensator 91 performs a wavelength dispersion processing by using a digital filter that models waveform distortion due to wavelength dispersion in a transversal filter or the like with respect to the digital electrical signal input from the ADC 722.

The sampling phase synchronization unit 92 performs processing for synchronizing the timing (frequency and phase) of sampling in the ADC 722 with the center of a data pulse.

The adaptive equalizer 93 includes, for example, a plurality of linear filters, and adaptively equalizes (compensates) the waveform distortion due to polarization fluctuation or polarization mode dispersion (PMD) by adaptively updating parameters of each filter at a sufficiently higher speed than the polarization fluctuation of the signal light. The equalization process may be performed, for example, at a symbol rate.

The frequency offset compensator 94 compensates (corrects) a frequency offset between the received signal light and the output light of the local oscillation light source. The estimation of the frequency offset may be performed by applying, for example, an estimation method called exponentiation, or an estimation method called a pre-decision based angle differential frequency offset estimator (PADE) method capable of enlarging an estimation range of the frequency offset compared to exponentiation.

The carrier phase reconstruction unit 95 estimates a correct carrier phase by removing a noise component from the received digital signal whose frequency offset is compensated by the frequency offset compensator 94, and synchronizes the phase of the received digital signal with the estimated carrier phase. The estimation of the carrier phase may be performed by applying, for example, a feedback method of eliminating the effects of noise by using a digital loop filter, or a feed forward method of eliminating the effects of noise by averaging estimated phase differences detected by the phase detector.

The dispersion compensator 91, the sampling phase synchronization unit 92, the adaptive equalizer 93, the frequency offset compensator 94 and the carrier phase reconstruction unit 95 may be implemented by, for example, a computing device, such as a DSP, having computing capabilities. The computing device may be referred to as a "processor device" or "processor circuit."

Subsequently, returning to FIG. 11, the controller 73 controls the operations of the transmitter 71 and the receiver 72 as described above. Further, the controller 73 monitors the channel spacing based on the received digital signal obtained by the receiver 72, and superimposes the monitoring result (or wavelength control information based on the monitoring result) on the transmission signal of the transmitter 71.

Therefore, the controller 73 includes, for example, a main signal data capturer 731, a wavelength spacing monitor 732, and a frequency modulation pattern generator 733.

The main signal data capturer 731, for example, as illustrated in FIG. 12, obtains (captures) main signal data having a data length sufficient to monitor the channel spacing from the output of the ADC 722. The capturing position of the main signal data may be the output of the dispersion compensator 91 (the input of the sampling phase synchronization unit 92).

If the dispersion compensation by the dispersion compensator 91 is fully functional to obtain stable main signal data, the improvement of accuracy in monitoring the channel spacing can be expected. As the capturing position of the main signal data, the output of the adaptive equalizer 93, the output of the carrier phase reconstruction unit 95 or the like can be also considered.

However, in the case of these outputs, the rate of the received data signal is being reduced to the symbol rate (i.e., down-sampled). Accordingly, the signal component of the adjacent channel observable according to the oversampling as described with reference to FIG. 8 may not be sufficiently observed.

As a result, in the monitoring method which will be described later, the channel spacing may not be monitored with necessary and sufficient accuracy. In other words, the capturing position of the main signal data is not limited to the output of the ADC 722 or the output of the dispersion compensator 91 if the data signal has a rate at which the signal component of the adjacent channel is sufficiently observable.

The wavelength spacing monitor 732 obtains the channel spacing by analyzing the main signal data (hereinafter referred to as "capture data") captured by the main signal data capturer 731. For example, the wavelength spacing monitor 732 converts the capture data from data in a time domain to data in a frequency domain (i.e., frequency spectrum signal) by performing a Fast Fourier Transform (FFT) operation on the capture data. Instead of the FFT operation, a Discrete Fourier Transform (DFT) operation may be used.

As explained with reference to FIG. 8, when the channel spacing is narrow as in the super-channel, the frequency spectrum signal (hereinafter, simply referred to as "spectrum signal") obtained by the FFT operation may contain a part of the spectrum of the adjacent channel. For example, a part of the spectrum of the adjacent channel may appear on the high frequency side with respect to the frequency (e.g., about 18 GHz) at which a drop of the power is maximized.

The wavelength spacing monitor 732 measures the width of a gap between channels based on the frequency spectrum, and determines a wavelength control amount of the transmission wavelength of the transmitter 81 of the opposing transponder 80 based on the measurement result.

As an example of a method of measuring the width of a gap between channels, there is a method of setting a determination threshold value on a longitudinal axis (power) of the spectrum, and determining a section in which the power of the spectrum is below the determination threshold value as the gap width.

Referring back to FIG. 11, the frequency modulation pattern generator 733 incorporates information (hereinafter sometimes referred to as "wavelength control information") indicating the wavelength control amount determined by the wavelength spacing monitor 732 into a pattern of frequency modulation represented by two values such as "1" or "0."

The pattern of frequency modulation (hereinafter sometimes referred to as a "frequency modulation pattern") is provided to the transmission digital signal processor 711 of the transmitter 71. The transmission digital signal processor 711 performs frequency modulation on the transmission digital data signal according to the frequency modulation pattern.

Thus, the wavelength control information is superimposed as an example of the supervisory control information on the transmission modulated signal light to the opposing transponder 80. Thus, the transmitter 71 may be considered as an example of a transmitter which transmits the wavelength control information according to the monitoring result of the wavelength spacing monitor 732 to the transponder 80.

Meanwhile, the superimposition of the wavelength control information may be realized, for example, by controlling the carrier frequency of a signal obtained by spectrum shaping of the transmission digital data signal by digital signal processing in the transmission digital signal processor 711.

Figure 13:
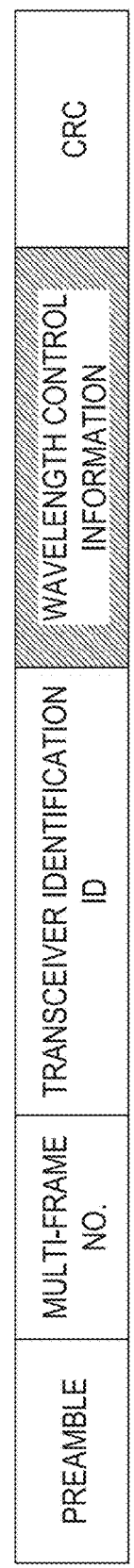
FIG. 13 is a diagram illustrating an exemplary format of a frequency modulation pattern frame to be superimposed on the transmission signal in the optical transmission system illustrated in FIG. 11.

FIG. 13 illustrates an example of a frame format of the frequency modulation pattern. The wavelength control information is mapped to a frame (hereinafter sometimes referred to as a "frequency modulation pattern frame") as illustrated in FIG. 13.

At the start of the frame, a preamble which is an example of a known signal between the transponders 70 and 80 may be assigned. The reception-side transponder 80 can identify the start of the frame by detecting the preamble.

At the end of the frame, an error detection code such as cyclic redundancy check (CRC) may be assigned. On the reception side, it is possible to confirm the validity of the received frame by using the error detection code.

Also, for example, information (which may be referred to as "transceiver identification ID") that enables identification of a pair of the transmitter and the receiver to be wavelength controlled by the wavelength control information may be mapped to the frequency modulation pattern frame.

If the transceiver identification ID or the wavelength control information is not accommodated in one frame, the transceiver identification ID or the wavelength control information may be divided and transmitted in multiple frames. In the case of multi-frame transmission, a multi-frame number may be assigned to the frequency modulation pattern frame.

In this example, the wavelength control information according to the monitoring result of the wavelength spacing monitor 732 is superimposed on the transmission modulated signal light to the transponder 80, but the monitoring result itself may be superimposed on the transmission modulated signal light to the transponder 80.

In the transponder 80, the wavelength control information may be determined from the received monitoring result. In other words, the wavelength control information may be determined by any of the monitor side and the wavelength control target side.

Next, an exemplary configuration of the (wavelength control target) transponder 80 illustrated in FIG. 11 will be described. The wavelength control target transponder 80 illustrated in FIG. 11 includes, for example, a transmitter 81, a receiver 82, and a controller 83.

The transmitter 81 includes, for example, a transmission digital signal processor 811, a DAC 812, an optical modulator 813, and a transmission light source (e.g., LD) 814.

The transmission digital signal processor 811, the DAC 812 and the optical modulator 813 may be identical or similar to the transmission digital signal processor 711, the DAC 712 and the optical modulator 713, respectively, in the transponder 70.

For example, the transmission digital signal processor 811 performs digital signal processing such as waveform (spectrum) shaping, carrier frequency control or nonlinear compensation on a transmission digital data signal.

The DAC 812 converts the transmission digital data signal which has been subjected to digital signal processing by the transmission digital signal processor 811 into an analog data signal. The analog data signal obtained by the DAC 812 is provided to the optical modulator 813 as a drive signal of the optical modulator 813.

The optical modulator 813 generates a transmission modulated signal light by modulating the output light of the transmission light source 814 by the drive signal provided from the DAC 812. The transmission modulated signal light is transmitted to the optical transmission line 20 leading to the opposing transponder 70. Similarly to the transmission light source 714, the transmission light source 814 may be a light source (e.g., tunable LD) whose emission wavelength is variable.

Although not illustrated in FIG. 11, also in the transmitter 81, similarly to the transmitter 71 of the transponder 70, the supervisory control information may be superimposed as a frequency modulation component on the transmission modulated signal light by the transmission digital signal processor 811.

The receiver 82 includes, for example, a receiver FE 821, an ADC 822, and a reception digital signal processor 823. The receiver FE 821, the ADC 822 and the reception digital signal processor 823 may be identical or similar to the receiver FE 721, the ADC 722 and the reception digital signal processor 723 in the receiver 72 of the transponder 70.

Optionally, the receiver 82 may include a frequency modulation (FM) detector 820, for example, at a front stage of the receiver FE 821. The FM detector 820 FM detects a superimposed signal by receiving the signal light on which the wavelength control information is superimposed by frequency modulation in the transmitter 71 of the opposing transponder 70 as described above. The detection signal is provided to, for example, the controller 83 (frequency modulation pattern decoder 831 to be described later).

The controller 83 includes, for example, the frequency modulation pattern decoder 831 and a wavelength control amount calculator 832.

The frequency modulation pattern decoder 831 decodes the frequency modulation pattern superimposed on the signal light received by the receiver 82. If the FM detector 820 is provided in the receiver 82 as described above, the frequency modulation pattern decoder 831 decodes the frequency modulation pattern from the FM detection signal.

If the FM detector 820 is not provided in the receiver 82, the controller 83 may include a carrier frequency offset monitor 830.

The carrier frequency offset monitor 830 obtains a signal equivalent to the detection signal obtained by the FM detector 820 by performing processing equivalent to FM detection on a reception digital data signal which has been subjected to digital signal processing by the reception digital signal processor 823.

For example, it may be possible to obtain an FM detection signal in a process of estimating the frequency offset by the frequency offset compensator 94 (see, FIG. 12).

In this case, the frequency modulation pattern decoder 831 decodes the frequency modulation pattern represented by two values such as "1" or "0" from the FM detection signal obtained by the carrier frequency offset monitor 830.

The wavelength control amount calculator 832 calculates and determines the wavelength control amount based on the wavelength control information indicated by the frequency modulation pattern decoded by the frequency modulation pattern decoder 831, and controls the emission wavelength of the transmission light source 814 of the transmitter 81 according to the wavelength control amount.

The control of the emission wavelength may be performed in stages. For example, if the wavelength control amount is greater than a predetermined threshold value, the control amount may be adjusted such that after dividing the wavelength control amount into several times, the emission wavelength is shifted slightly by the divided amount.

Alternatively, if a delay is included in the feedback loop until adjusting the emission wavelength after monitoring the channel spacing, the one-time control amount may be adjusted for stable leading-in of the emission wavelength. Alternatively, if a random error is included in the wavelength control amount, it is possible to reduce the error by averaging the multiple control amounts. The control amount may be adjusted for such a purpose.

Meanwhile, the monitoring function including the controller 73 in the above-described transponder 70 may be also provided in the opposing transponder 80 (e.g., controller 83). Similarly, the transmission wavelength control function including the controller 83 in the transponder 80 may be also provided in the transponder 70 (e.g., controller 73). In other words, each of the transponders 70 and 80 may function as both a monitor transponder and a wavelength control target transponder.

Further, the "channel spacing" usually means a distance between the center wavelength of one channel and the center wavelength of the adjacent channel. However, as illustrated in FIG. 4B, in the super-channel, since the spectrum of each channel is shaped in a rectangular shape, the width of the spectrum may be considered to be equivalent to the width of the rectangle.

Figure 14:
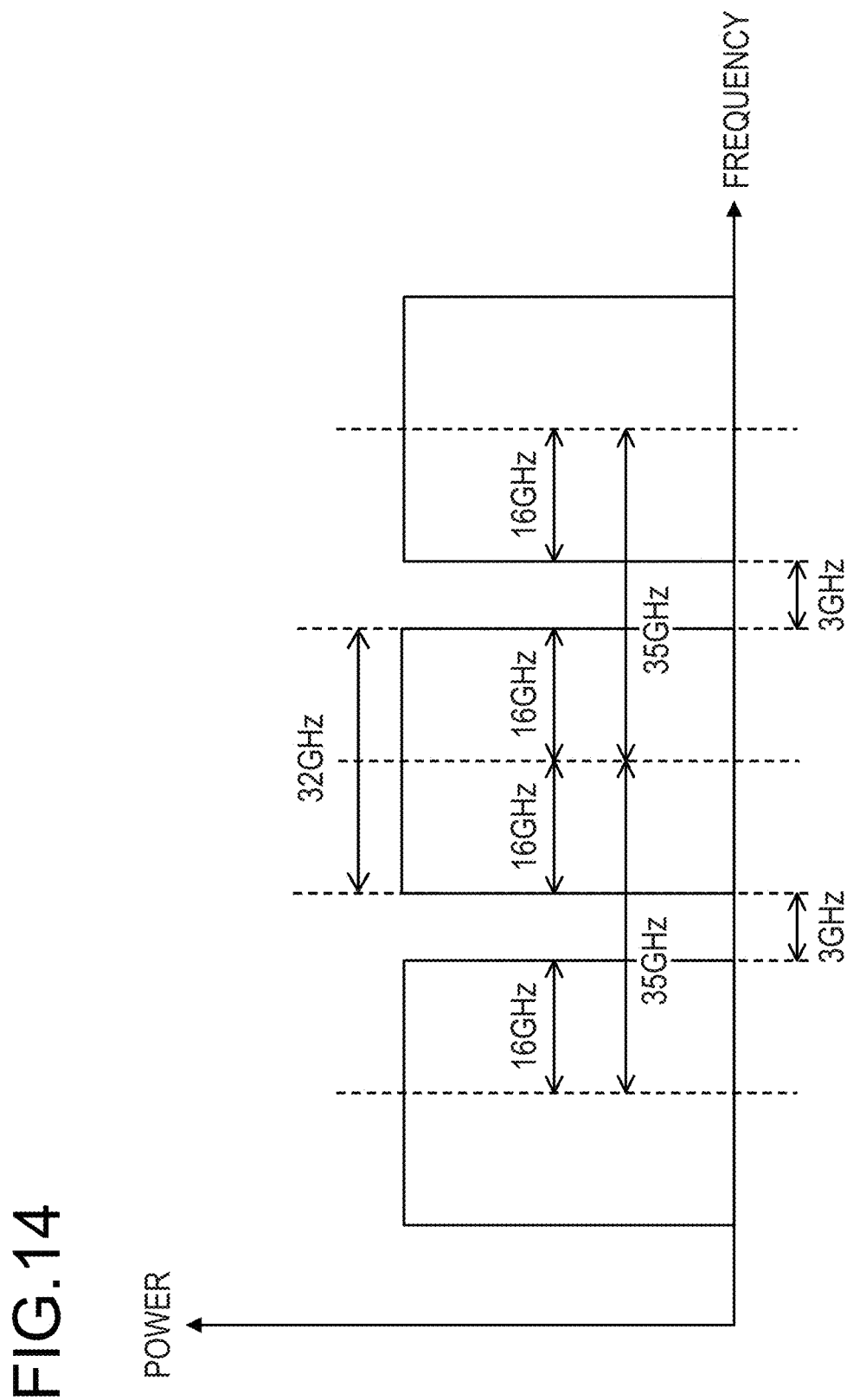
FIG. 14 is a diagram illustrating an example of channel arrangement of the super-channel signal which is spectrally shaped into a rectangular shape in a transmission digital signal processor illustrated in FIG. 11.

For example, as schematically illustrated in FIG. 14, the width of the spectrum may be considered as 32 GHz in full width of the rectangle and 16 GHz in half width of the rectangle. Therefore, if the width of the gap between channels is measurable, the gap width can be converted into the channel spacing by calculation of "gap width (e.g., 3 GHz)+ spectrum full width (e.g., 32 GHz)=channel spacing (e.g., 35 GHz)."

(Example of the Transmission Wavelength Control)

Next, a description will be made of an example of the transmission wavelength control in the wavelength control target transponder 80 that has received the wavelength control information according to the wavelength control amount determined by the wavelength spacing monitor 732.

As described with reference to FIG. 11, in the wavelength control target transponder 80, the frequency modulation pattern decoder 831 of the controller 83 decodes the frequency modulation pattern superimposed as a frequency modulation component on the signal light received by the receiver 82.

The frequency modulation component includes, for example, two types of periodically varying frequency offset values "+Δf" and "−Δf." By using equations "+Δf"="1" and "−Δf"="0," it is possible to represent the frequency modulation pattern of two values of "1" or "0." Thus, for example, in the carrier frequency offset monitor 830 (see, e.g., FIG. 11), by detecting two types of frequency offset values through detection, it is possible to restore the frequency modulation pattern including the wavelength control information.

The frequency modulation pattern decoder 831 detects a frame start position by detecting a preamble from the restored frequency modulation pattern (frame, see, e.g., FIG. 13). Further, the frequency modulation pattern decoder 831 extracts the number of bits corresponding to the frame length from the detected frame start position, and performs the computation of the error detection using the CRC at the end of the frame.

As a result of the error detection, if it is determined that there is an error, the frequency modulation pattern decoder 831 discards the corresponding frame. If it is determined that there is no error, the frequency modulation pattern decoder 831 extracts the wavelength control information mapped to the frame and provides the wavelength control information to the wavelength control amount calculator 832.

The wavelength control amount calculator 832 controls the emission wavelength of the transmission light source 814 in the transmitter 81 according to the wavelength control amount indicated by the wavelength control information provided from the frequency modulation pattern decoder 831. Meanwhile, for example, in a case where the wavelength control amount is greater than a predetermined threshold value, the wavelength control amount calculator 832 may adjust the control amount such that after dividing the wavelength control amount into plural amounts, the emission wavelength of the transmission light source 814 is shifted by the divided amount.

The wavelength control amount calculator 832 controls the emission wavelength of the transmission light source 814 such that the channel spacing between adjacent channels is constant. However, the wavelength control amount calculator 832 may set one of channels as a reference channel whose wavelength is not controlled without controlling all of a plurality of channels which are wavelength-multiplexed, and may control the wavelengths of the other channels based on the reference channel.

As described above, the channel spacing of the super-channel can be monitored easily, at the reception-side transponder 70, without using an expensive measuring instrument such as a spectrum analyzer. Therefore, as described with reference to FIG. 9, since it is not necessary to provide the monitor 61 in the optical network 60, it is possible to suppress an increase in work and cost.

Further, by superimposing the wavelength control information according to the monitoring result on the modulated signal light transmitted from the reception-side transponder 70 to the transmission-side transponder 80, it is possible to control the emission wavelength of the transmission light source 814. Therefore, as described with reference to FIG. 9, it is not necessary to additionally install the control signal path for the feedback.

Consequently, since the wavelength control of the transmission light source 814 can be realized at low cost, it is possible to make the channel spacing narrow independent of the wavelength fluctuation of the transmission light source 814. Thus, as illustrated in Table 1, it is possible to improve the transmission quality by ensuring the outer peripheral margin and improve the utilization efficiency of frequency bands.

Meanwhile, in the optical transmission system 1, during its operation, the wavelength of a new signal light may be set additionally, or such additional setting may be required. However, the channel spacing (i.e., bandwidth) enough to add a new signal light may not be ensured by the channel spacing control described above. If the signal light of an additional channel is added to such a vacant wavelength region, the spectrum of the signal light of the additional channel may interfere with adjacent channels.

FIG. 15 schematically illustrates an example of inter-channel interference caused by the addition of a channel. In FIG. 15, a case where channel B is newly added between channel A and channel C is illustrated. For example, the channels A to C may be set as sub-channels of a certain super-channel.

A spacing between the channel A and the channel C may have been controlled to a suitable channel spacing by the channel spacing control described above. In order to maximize the utilization efficiency of frequency (or wavelength) resources available in the optical transmission system 1, the spacing between the channel A and the channel C may already be narrowed as much as possible. For example, the channel spacing may be narrowed with a margin of about 1.5 GHz at one side (3 GHz at both sides) per channel.

If the channel B is added even though the channel spacing (bandwidth) is not a bandwidth enough to add the channel B, interference of the signal light spectrum occurs between the additional channel B and one or both of the existing channels A and C adjacent thereto. The interference between the channels may be referred to as "crosstalk."

When the crosstalk occurs, some or all of transmission characteristics of the channels A to C are degraded, and in the worst case, at the reception side (e.g., the above-described receiver 82), it is impossible to correctly receive the signal, for example, because the frame synchronization of the received signal cannot be maintained, which may cause signal interruption.

Therefore, in embodiments to be described below, descriptions will be made on an example of the wavelength control allowing addition of a channel without causing the crosstalk for a wavelength region where a bandwidth sufficient to add a channel is not ensured during an operation of the existing channels or during the wavelength control.

FIGS. 16A-16E schematically illustrate examples of the wavelength control. FIG. 16A illustrates, similarly to the case of FIG. 15, a state in which the channel A and the channel C are set as the existing channels and in operation.

It is assumed that the channel spacing of the existing channels A and C is controlled to a spacing insufficient to add the channel B with a normal main signal light spectrum width. The "normal main signal light spectrum width" may be regarded as being equivalent to the spectrum width at which the main signal can be transmitted in an error-free state. The spectrum width may be regarded as the same or substantially the same as the main signal light spectrum width of the existing channels A and C.

In this case, as illustrated in FIG. 16B, the optical spectrum of the channel B is narrowed made to have a narrow bandwidth, which is narrower than the normal main signal light spectrum width (i.e., spacing between the channels A and C). Then, the narrow-band channel B is added between the channel A and the channel C. The "addition of a channel" may be regarded as the start of transmission of the signal light by the channel.

By adding the channel B of the narrowed optical spectrum, it is possible to prevent the inter-channel interference from occurring between the additional channel B and the existing channels A and C.

The "transmitters" of the channels A and C may be, for example, "transmitter A1" and "transmitter C1" (or "transmitter A2" and "transmitter C2") illustrated in FIG. 10. The "transmitter" of the additional channel B may be, for example, "transmitter B1" (or "transmitter B2") illustrated in FIG. 10.

In other words, the addition of the channel B may be regarded as adding the transmitter B1 (or transmitter B2), or controlling the existing transmitter B1 (or transmitter B2) from a disable state to an enable state.

The signal of the channel B to be narrowed in the transmitter B1 (or transmitter B2) may or may not be a main signal (or a signal generated from the main signal). For example, the signal when the channel B is added (i.e., when the transmission starts) may be a preset signal different from the main signal and capable of generating a narrowband spectrum. This signal may also be referred to as a "test signal" or a "pilot signal."

The test signal may be, for example, a periodic pattern signal in which one or more of "0" and "1" are repeated. Since the periodic pattern signal has a small amount of information as compared to the main signal, the spectrum of the signal light generated by the optical modulator 713 can be narrowed easily. Meanwhile, a "pattern signal" may be referred to as a "test pattern" for convenience.

After adding the channel B, as illustrated in FIG. 16C, the spectrum width of the additional channel B is enlarged gradually. In this case, the channels A and C may be adaptively controlled such that the spacing between adjacent channels becomes an appropriate spacing by the channel spacing monitoring described above. Then, the channels A and C are shifted gradually in a direction away from the channel B according to the expansion of the spectrum width of the additional channel B.

Then, as illustrated in FIG. 16D, when the spectrum width of the channel B is extended to the normal main signal light spectrum width (e.g., the same spectrum width as the spectrum width of the channels A and B), the transmission signal of the channel B is switched from the test pattern to the main signal.

The "normal main signal light spectrum width" is an example of a second bandwidth in the case where a narrowed bandwidth when the channel B is added (when the transmission starts) is regarded as a "first bandwidth." Therefore, gradually enlarging the spectrum width of the additional channel B may be regarded as being equivalent to gradually enlarging the spectrum width of the channel B from the first bandwidth toward the second bandwidth.

Thereafter, as illustrated in FIG. 16E, the wavelength control may be applied to the additional channel B similarly to the wavelength control already described for the other channels A and C. Thus, the channel spacing of the channels A to C is adaptively controlled to be an appropriate spacing.

The above-described wavelength control is represented as a flowchart in FIG. 17 (operations P11 to P16). In FIG. 17, operations P11 and P12 correspond to "adding the test pattern of the channel B" illustrated in FIG. 16B. Operation P13 corresponds to "enlarging the spectrum width of the channel B" illustrated in FIG. 16C.

Operation P14 corresponds to determining whether the spectrum width of the channel B has been enlarged to a width sufficient to transmit the main signal light in an error-free state, for example, in FIG. 16D.

As a result of the determination, if it is determined that the expansion of the spectrum width is still insufficient (NO in operation P14), the expansion of the spectrum width is continued. On the other hand, as a result of the determination, if it is determined that the expansion of the spectrum width is sufficient (YES in operation P14), the expansion of the spectrum width is stopped, and the signal to be transmitted by the channel B is switched to the main signal from the test pattern (operation P15).

Then, in operation P16, as illustrated in FIG. 16E, the channel spacing control of the channels A to C is performed.

As described above, even if the channel spacing in the super-channel is narrowed as much as possible to improve the frequency utilization efficiency, it is possible to add a new channel without affecting the adjacent channel (e.g., without generating the crosstalk).

Therefore, during the channel design and the operation of the optical transmission system 1, there is no need to set aside a band of vacant channels for future use, thereby increasing the flexibility of wavelength arrangement. As a result, it is possible to improve the utilization efficiency of a frequency band in the optical transmission system 1.

Hereinafter, some embodiments for realizing the wavelength control when adding the channel as described above will be described.

First Embodiment

Figure 18:
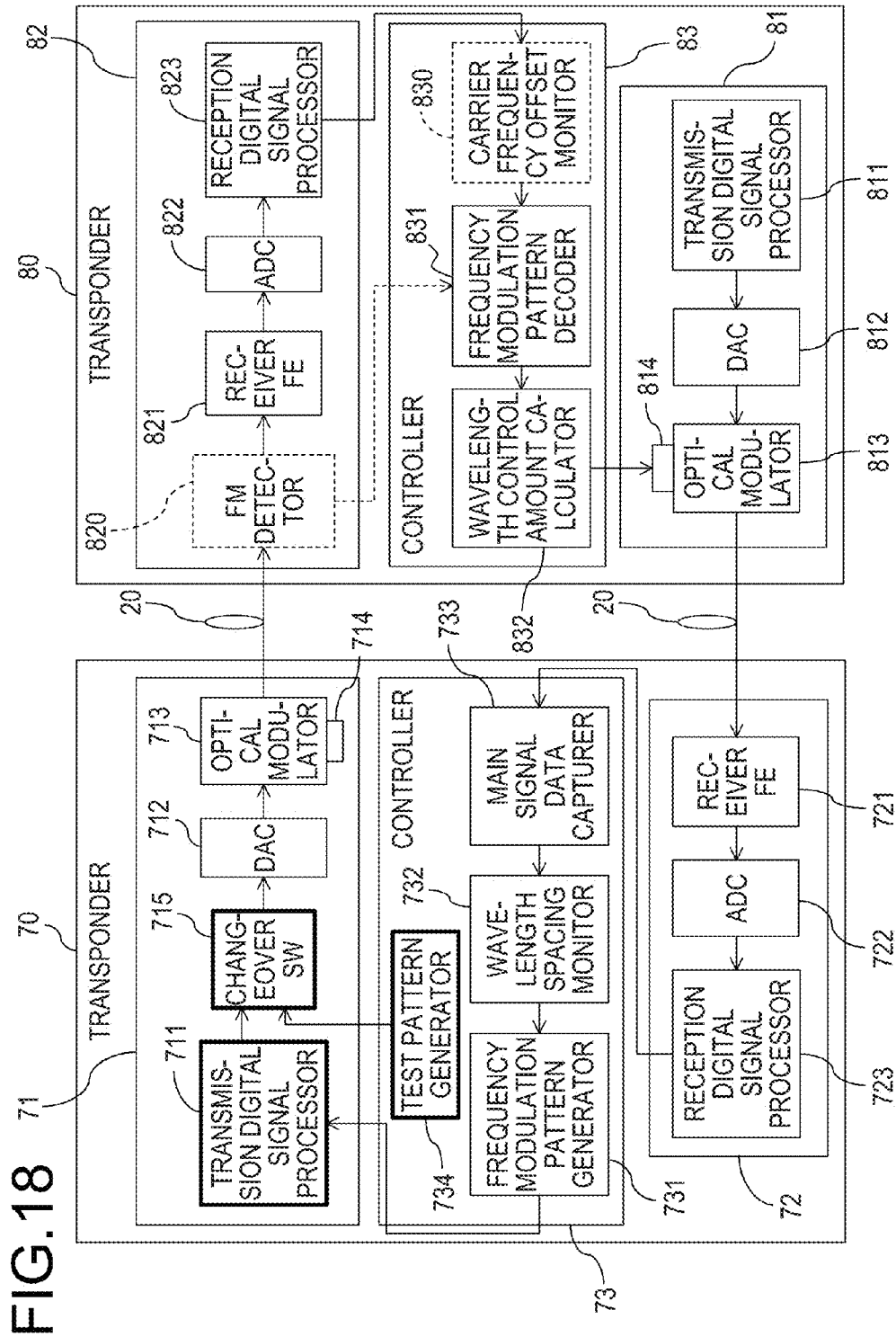
FIG. 18 is a block diagram illustrating an exemplary configuration of a transponder implementing the wavelength control illustrated in FIGS. 16A-16E and 17.

FIG. 18 is a block diagram illustrating an exemplary configuration of a transponder according to a first embodiment, and is a diagram corresponding to FIG. 11. Also in FIG. 18, similarly to FIG. 11, the transponder 70 and the transponder 80 are connected to each other via the optical transmission line 20 (i.e., the optical network 60 illustrated in FIG. 10) to enable a bidirectional optical communication.

The transponder 70 illustrated in FIG. 18 is different from the configuration illustrated in FIG. 11 in that a test pattern generator 734 is provided in the controller 73 and a changeover switch (SW) 715 is provided in the transmitter 71. In FIG. 18, parts denoted by the same reference numerals as those in FIG. 11, unless otherwise indicated, are identical or similar to the previously described parts.

The test pattern generator 734 generates the above-described test pattern. The test pattern generator 734 may be able to generate multiple types of test patterns. The multiple types of test patterns, for example, may be selected according to the degree of narrowing.

The degree of narrowing may be determined based on the monitoring result by the channel spacing monitoring described above. In other words, the test pattern generator 734 may adaptively select and generate an appropriate test pattern according to the channel spacing, which is monitored by the channel spacing monitoring described above. For example, the test pattern generator 734 may select a test pattern such that a narrower-band spectrum is generated as the monitored channel spacing is narrower.

The changeover switch 715 is provided, for example, between the transmission digital signal processor 711 and the DAC 712, switches the output signal of the transmission digital signal processor 711 and the output signal of the test pattern generator 734, and (selectively) outputs the signals to the DAC 712.

The signal switching by the changeover switch 715 may be controlled, for example, by the controller 73. The controller 73 may receive a switching control signal for the changeover switch 715 from the line-card controller 114-1 illustrated in FIG. 2.

The switching control signal for the changeover switch 715 may be provided to the optical transmission apparatus 10 from a control system for controlling the optical transmission system 1, which is called a network management system (NMS), an operation system (OPS) or the like. Alternatively, the switching control signal for the changeover switch 715 may be input to the optical transmission apparatus 10 from an operator terminal that can be connected to the optical transmission apparatus 10.

For example, the changeover switch 715 of the transmitter 71 corresponding to the additional channel is switched, by the controller 73, to select the test pattern generated by the test pattern generator 734. Thus, the test pattern generated by the test pattern generator 734 is input to the DAC 712.

The DAC 712 converts the test pattern input from the changeover switch 715 into an analog signal, and provides the analog signal to the optical modulator 713 as a drive signal of the optical modulator 713.

The optical modulator 713, as described above, generates the transmission modulated signal light by modulating the output light of the transmission light source 714 by the drive signal provided from the DAC 712.

The transmission modulated signal light has the spectrum narrower than the transmission modulated signal light of the normal main signal because it is modulated by the drive signal corresponding to the test pattern.

Figure 20:
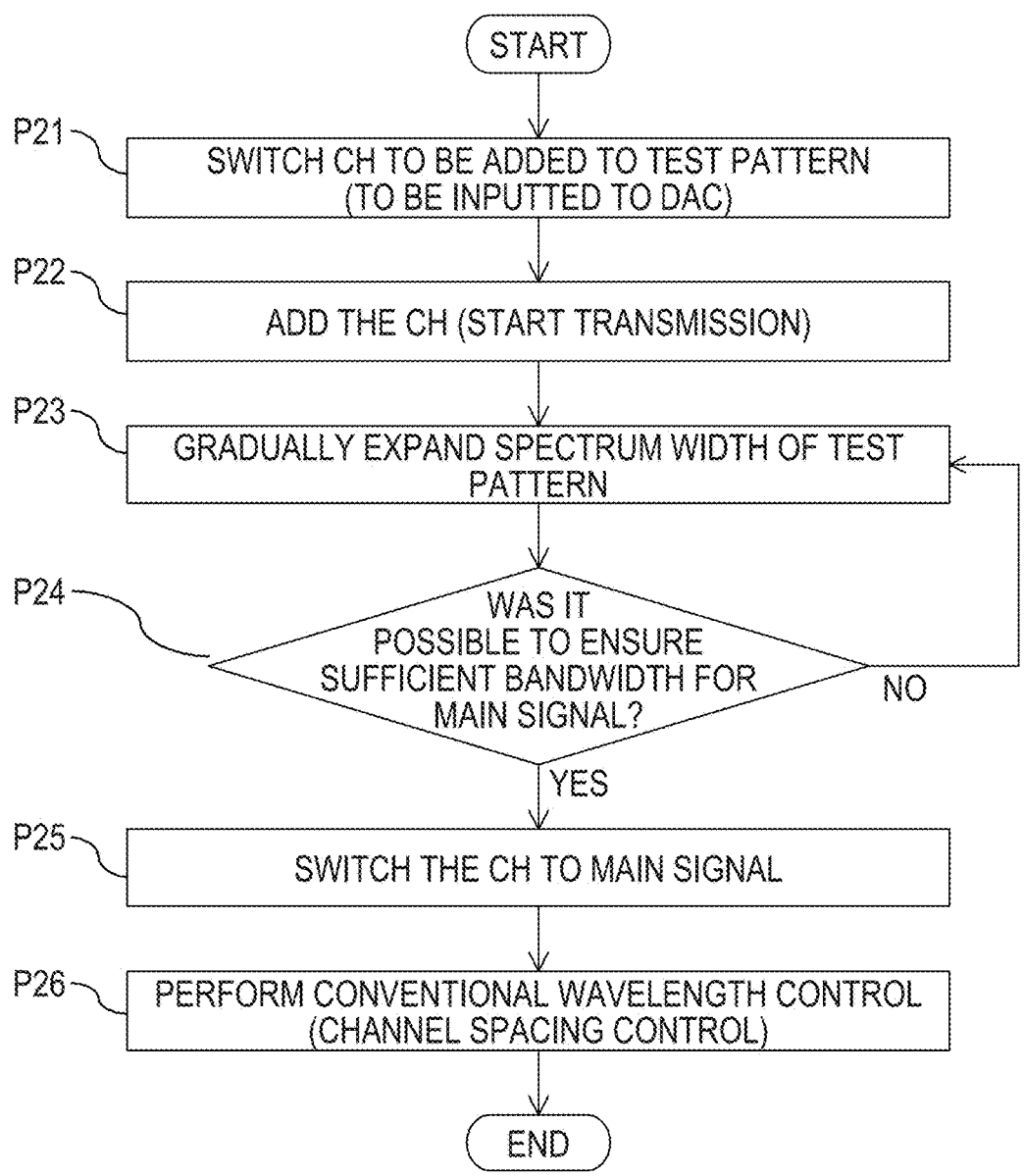
FIG. 20 is a flowchart explaining an operation of a first embodiment.

The above processing, for example, corresponds to operations P21 and P22 in FIG. 20, and also corresponds to FIGS. 16A and 16B and operations P11 and P12 in FIG. 17.

In the initial transmission stage of the additional channel, a specific test pattern is selected and, thereafter, the test pattern may be switched stepwise such that the width of the narrowed spectrum is expanded gradually.

Figure 19:
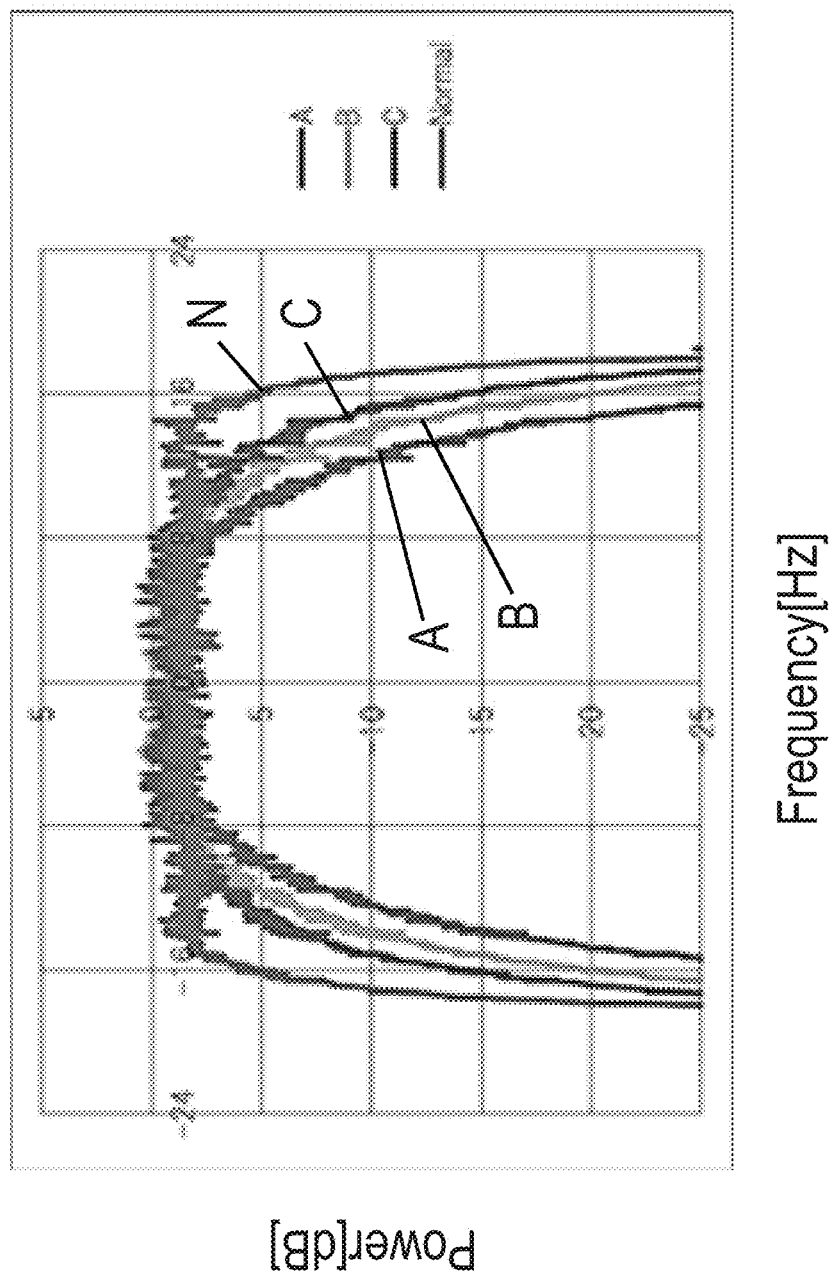
FIG. 19 is a diagram illustrating an example of an optical spectrum corresponding to a test pattern generated by a test pattern generator illustrated in FIG. 18.

For example, it is assumed that the test pattern generator 734, as illustrated in FIG. 19, can generate four kinds of spectrums A to C and N with different degrees of narrowing by four types of test patterns.

Meanwhile, the test patterns corresponding to the spectrums A to C and N may be referred to as "test patterns A to C and N" for convenience sake. The spectrum N may be regarded as corresponding to the spectrum N of the normal main signal light. Further, the spectrum generated by the test pattern may be referred to as "test pattern spectrum" for convenience.

In the initial transmission stage, for example, the test pattern generator 734 selects a test pattern A with the minimum spectrum width that is insertable to the channel spacing monitored by the channel spacing monitoring.

Then, the test pattern generator 734 switches the test pattern A to a test pattern B capable of obtaining a wider-band spectrum B, and switches the test pattern B to a test pattern C capable of obtaining a much wider-band spectrum C.

In this way, the test patterns A to C are selected stepwise and, thus, the transmission light spectrum of the additional channel is gradually increased.

For example, the test pattern generator 734 receives the notification of the channel spacing monitored in the opposing station (receiving station), and determines whether the current channel spacing is a spacing (bandwidth) sufficient to insert the next test pattern spectrum to be selected stepwise.

As a result of the determination, if the bandwidth sufficient to insert the next test pattern spectrum is ensured, the test pattern generator 734 switches the current test pattern to the next test pattern. The test pattern generator 734 repeats the determination of the bandwidth and the switching of the test pattern until it is possible to select the test pattern N capable of obtaining the spectrum width corresponding to the normal main signal light.

The above-described processing, for example, corresponds to a loop process that leads to operation P23 from NO route of operation P24 in FIG. 20, and also corresponds to FIG. 16C and a loop process that leads to operation P13 from NO route of operation P14 in FIG. 17.

Finally, the test pattern generator 734 selects a test pattern N to thereby enlarge and change the bandwidth of the transmission light spectrum of the additional channel to the bandwidth of the spectrum N of the normal main signal light. Thus, it becomes a state in which the test pattern may be switched to the main signal.

Therefore, the controller 73 performs a control, by switching the changeover switch 715, such that the transmission digital data signal output from the transmission digital signal processor 711 is input to the DAC 712. The switching control, for example, corresponds to operation P25 of FIG. 20, and also corresponds to FIG. 16D and operation P15 of FIG. 17.

Thus, the transmission digital data signal, which is the main signal, as already described with reference to FIG. 11, is converted into an analog signal by the DAC 712, and a drive signal corresponding to the analog signal is input to the optical modulator 713.

The optical modulator 713 generates the transmission modulated signal light which is the main signal light of the additional channel by modulating the output light of the transmission light source 714 by the drive signal. The generated main signal light of the additional channel is transmitted to the optical transmission line 20.

Thereafter, the above-described channel spacing control is performed on a plurality of channels including the additional channel, and the channel spacing of the channels is controlled to an appropriate spacing. This processing, for example, corresponds to operation P26 of FIG. 20, and also corresponds to FIG. 16E and operation P16 of FIG. 17.

Meanwhile, the spectrum expansion control when the channel is added and the channel spacing control described above may be implemented in parallel (or alternately). Thus, the addition of a channel can be performed while effectively suppressing the occurrence of crosstalk.

Further, in the configuration illustrated in FIG. 18, since the changeover switch 715 is provided between the transmission digital signal processor 711 and the DAC 712, the test pattern is not subjected to frequency modulation for superimposing the above described supervisory control information according to transmission digital signal processing.

Since the test pattern is not frequency-modulated, similarly to comparison of the main signal, the amount of information to be transmitted is reduced. Therefore, as compared with the case of applying frequency modulation to the test pattern, the bandwidth of the spectrum generated based on the test pattern can be more easily narrowed.

However, since the test pattern is not frequency-modulated, for example, in order to notify the wavelength information of the additional channel or the information including the monitoring result of the channel spacing monitoring to the opposing station, the information is superimposed by the frequency modulation on the main signal light having a wavelength different from the wavelength of the test pattern.

Figure 21:
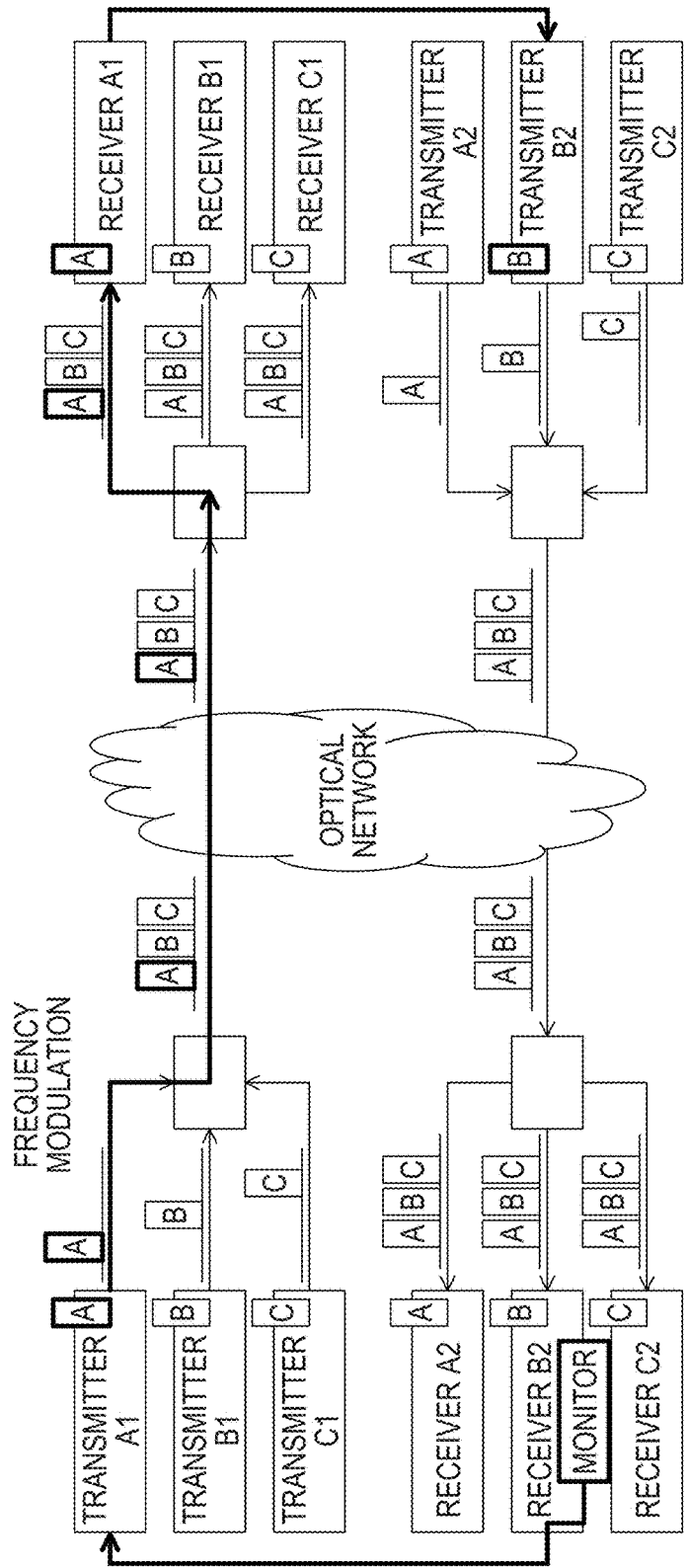
FIG. 21 is a schematic diagram explaining that the frequency modulation component is superimposed on a channel different from the transmission channel of the test pattern in the first embodiment.

For example, as schematically illustrated in FIG. 21, if the additional channel is the channel B, the notification information may be superimposed by the frequency modulation on the main signal light of the channel A (or channel C) which is different from the additional channel B.

In this case, since the transmission channel B of the test pattern is different from the transmission channel A (or C) of the notification information, even if the receiver of the opposing station has failed to detect the superimposed signal that is a frequency modulation component, it is possible to perform the wavelength control in accordance with the addition of the channel B.

Second Embodiment

Figure 22:
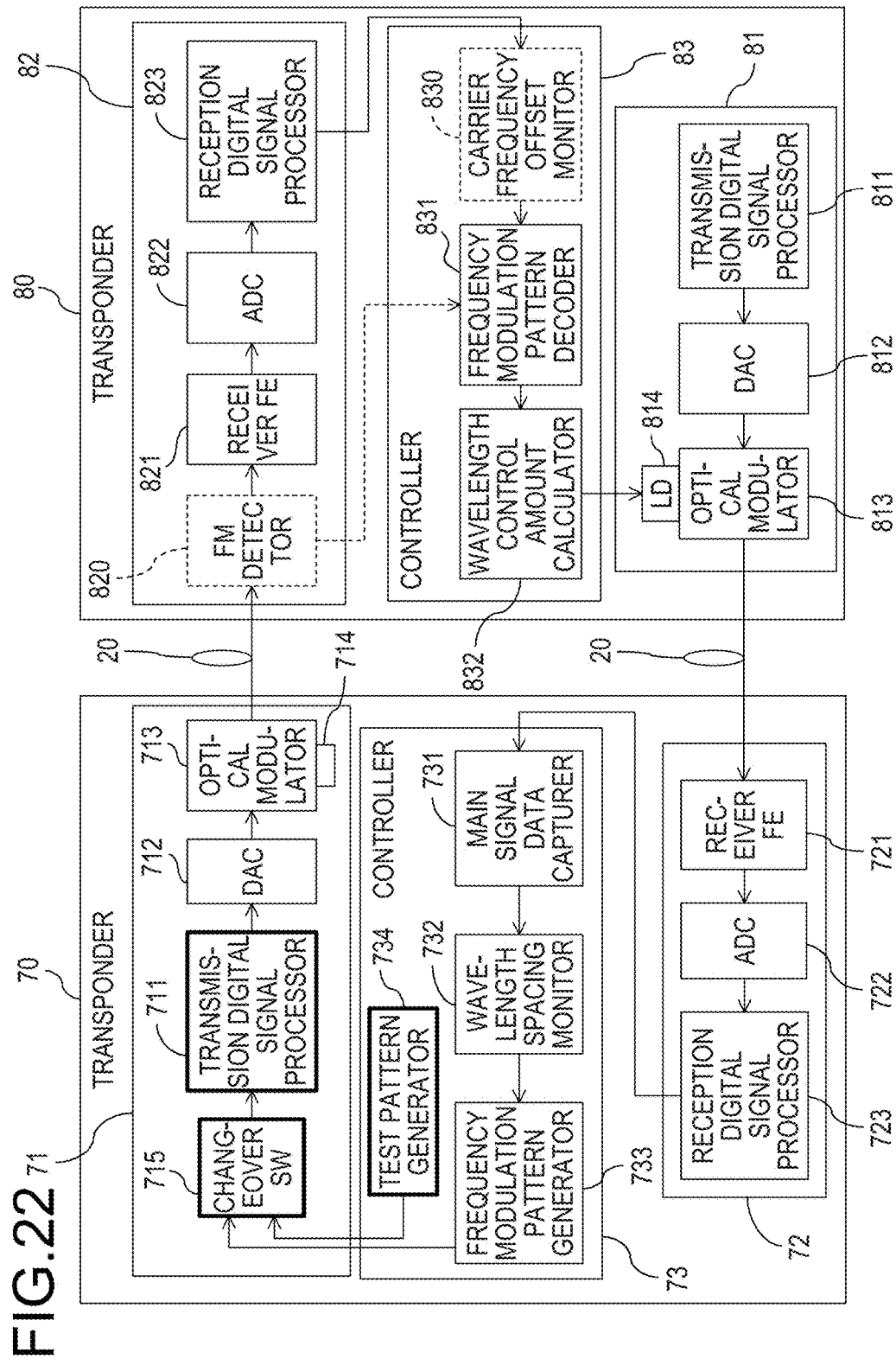
FIG. 22 is a block diagram illustrating an exemplary configuration of a transponder according to a second embodiment for implementing the wavelength control illustrated in FIGS. 16A-16E and 17.
Figure 23:
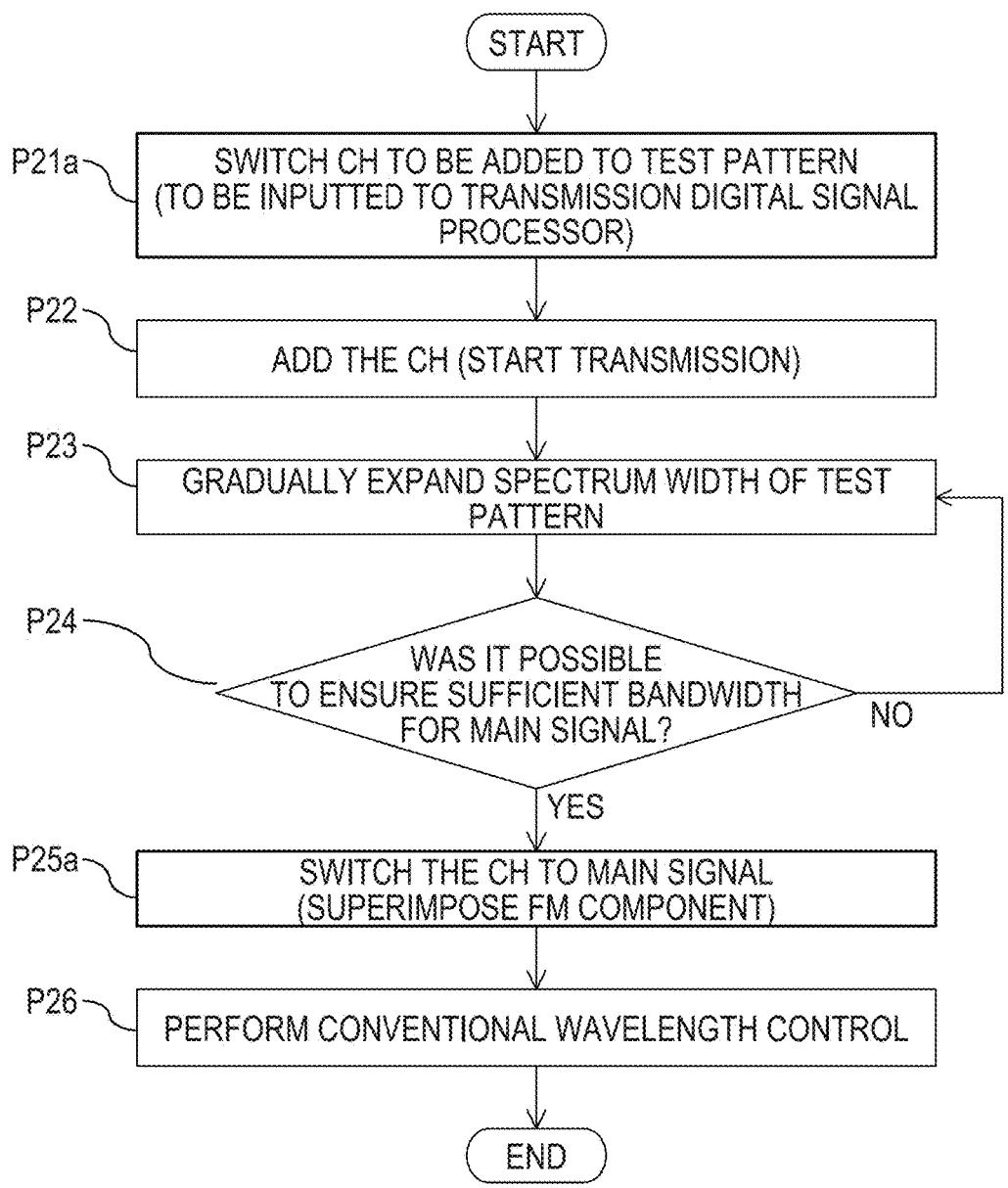
FIG. 23 is a flowchart explaining an operation of the second embodiment.

Next, a second embodiment will be described with reference to FIGS. 22 and 23. FIG. 22 is a block diagram illustrating an exemplary configuration of a transponder according to a second embodiment, and is a diagram corresponding to FIGS. 11 and 18.

Also in FIG. 22, similarly to FIGS. 11 and 18, the transponder 70 and the transponder 80 are connected to each other via the optical transmission line 20 (i.e., the optical network 60 illustrated in FIG. 10) to enable bidirectional optical communication.

The transponder 70 illustrated in FIG. 22 is different from the configuration illustrated in FIG. 18 of the first embodiment in that the changeover switch 715 is provided at a front stage of the transmission digital signal processor 711. In FIG. 22, parts denoted by the same reference numerals as those in FIGS. 11 and 18, unless otherwise indicated, are identical or similar to the previously described parts.

The changeover switch 715 of the second embodiment switches one of the frequency pattern generated by the frequency modulation pattern generator 733 and the test pattern generated by the test pattern generator 734, and (selectively) inputs the pattern to the transmission digital signal processor 711.

Therefore, the transmission digital signal processor 711 of the second embodiment, unlike the first embodiment, can frequency-modulate the test pattern by the digital signal processing. By the frequency modulation, it is possible to superimpose the information, as a frequency modulation component, on the test pattern as well as the main signal.

Thus, the transmitter 71 of the second embodiment, unlike the first embodiment, can transmit the information addressed to the opposing station by superimposing the information on the test pattern of the additional channel. Accordingly, it is not necessary to superimpose the wavelength information of the additional channel and the like on the main signal light of a different channel as in the first embodiment. Thus, for the channel to be added, the control can be achieved with its own wavelength without using a different wavelength, and it is possible to further simplify the control configuration.

In the second embodiment, the wavelength control when other channels are added may be the same as that of the first embodiment. For example, FIG. 23 illustrates a flow chart for explaining the operation of the second embodiment. As can be easily understood by comparing FIG. 23 with FIG. 20 of the first embodiment, in the second embodiment, operations P21 and P25 in FIG. 20 are replaced, respectively, by operations P21a and P25a in FIG. 23.

In the switching operation P21a to the test pattern, the changeover switch 715 of the transmitter 71 corresponding to the additional channel is switched to select the test pattern generated by the test pattern generator 734, and the test pattern is input to the transmission digital signal processor 711. Subsequent operations P22 to P24 (expansion control of the test pattern spectrum width) may be the same as those of the first embodiment.

In the switching operation P25a to the main signal, the changeover switch 715 of the transmitter 71 corresponding to the additional channel is switched to select the frequency modulation pattern generated by the frequency modulation pattern generator 733. In other words, the input of the test pattern to the transmission digital signal processor 711 is stopped.

The transmission digital signal processor 711, in response to the switching of the changeover switch 715, generates a transmission digital data signal which is the main signal, and outputs the transmission digital data signal to the DAC 712. At that time, the transmission digital signal processor 711 may incorporate a frequency modulation pattern into the transmission digital data signal as described above. Thus, the frequency modulation component is superimposed on the main signal light of the additional channel. Subsequent operation P26 (channel spacing control described above) may be the same as that of the first embodiment.

Meanwhile, depending on the degree of narrowing of the test pattern spectrum, there is a possibility that the opposing station fails to detect the frequency modulation component superimposed on the test pattern. Therefore, information such as the wavelength information or the channel spacing monitoring result, for example, similarly to the first embodiment (see, FIG. 21), may be transmitted by being superimposed on the main signal light of another channel different from the transmission channel (additional channel) of the test pattern.

Third Embodiment

Next, a third embodiment will be described with reference to FIGS. 24 and 25. In the first and second embodiments described above, an example of using the test pattern capable of generating a narrowband spectrum as a signal of a channel to be added has been described. In contrast, in the third embodiment, an example of narrowing the main signal light spectrum of the additional channel without using the test pattern will be explained.

For example, by adjusting the filter characteristics for use in digital signal processing of the main signal in the transmission digital signal processor 711, it is possible to narrow the main signal light spectrum produced by the optical modulator 713.

After narrowing the main signal light spectrum of a channel to be added, the channel is added. Accordingly, as in the first and second embodiments, it is possible to add a new channel without generating crosstalk.

Figure 24:
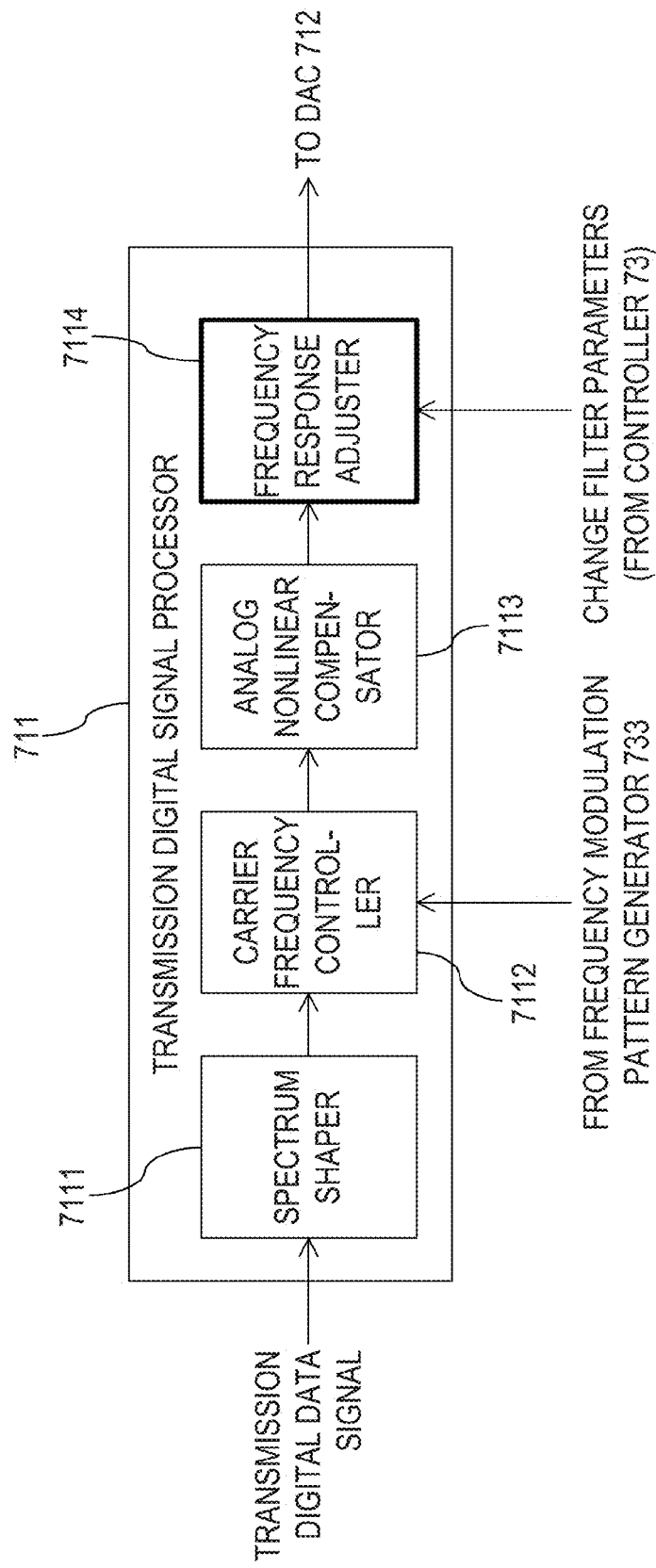
FIG. 24 is a block diagram illustrating an exemplary configuration of a transmission digital signal processor according to a third embodiment for implementing the wavelength control illustrated in FIGS. 16A-16E and 17.

FIG. 24 is a block diagram illustrating an exemplary configuration of the transmission digital signal processor 711 according to the third embodiment. The configuration illustrated in FIG. 24, for example, may be considered as being equivalent to an exemplary configuration of the transmission digital signal processor 711 illustrated in FIG. 11.

The transmission digital signal processor 711 illustrated in FIG. 24 includes, for example, a spectrum shaper 7111, a carrier frequency controller 7112, an analog nonlinear compensator 7113, and a frequency response adjuster 7114.

The spectrum shaper 7111, for example, as described above, performs a convolution processing on a transmission digital data signal (e.g., NRZ signal) which is a main signal by using a filter, such as a raised cosine filter that exhibits a time response in a Sinc function shape. Thus, the main signal light spectrum produced by the optical modulator 713 can be narrowed and shaped into a rectangular shape.

The carrier frequency controller 7112 frequency-modulates the main signal by controlling the carrier frequency of the main signal which has been spectrally shaped, for example, according to the frequency modulation pattern generated by the frequency modulation pattern generator 733 (see, e.g., FIG. 11). By this frequency modulation, as described above, the frequency modulation component is superimposed on the main signal.

The analog nonlinear compensator 7113 compensates the non-linearity (non-linear distortion) of the main signal which is frequency-modulated by the carrier frequency controller 7112.

The frequency response adjuster (may be referred to as an "equalizer") 7114 adjusts the frequency response characteristics of the main signal whose non-linearity has been compensated by the analog nonlinear compensator 7113 by using, for example, a digital filter. In the digital filter, for example, there exist various parameters such as step adjustment, tap coefficient adjustment, amplitude adjustment, and offset adjustment.

By adjusting these parameters (which may be referred to as "filter parameters"), it is possible to change the filter characteristics of the digital filter, and for example, it is possible to control the frequency characteristics of the main signal such that a band of the high frequency band side is restricted. By the band restriction, it is possible to narrow the band of the main signal light spectrum. The filter parameters may be adjusted, for example, by the controller 73 described above.

Figure 25:
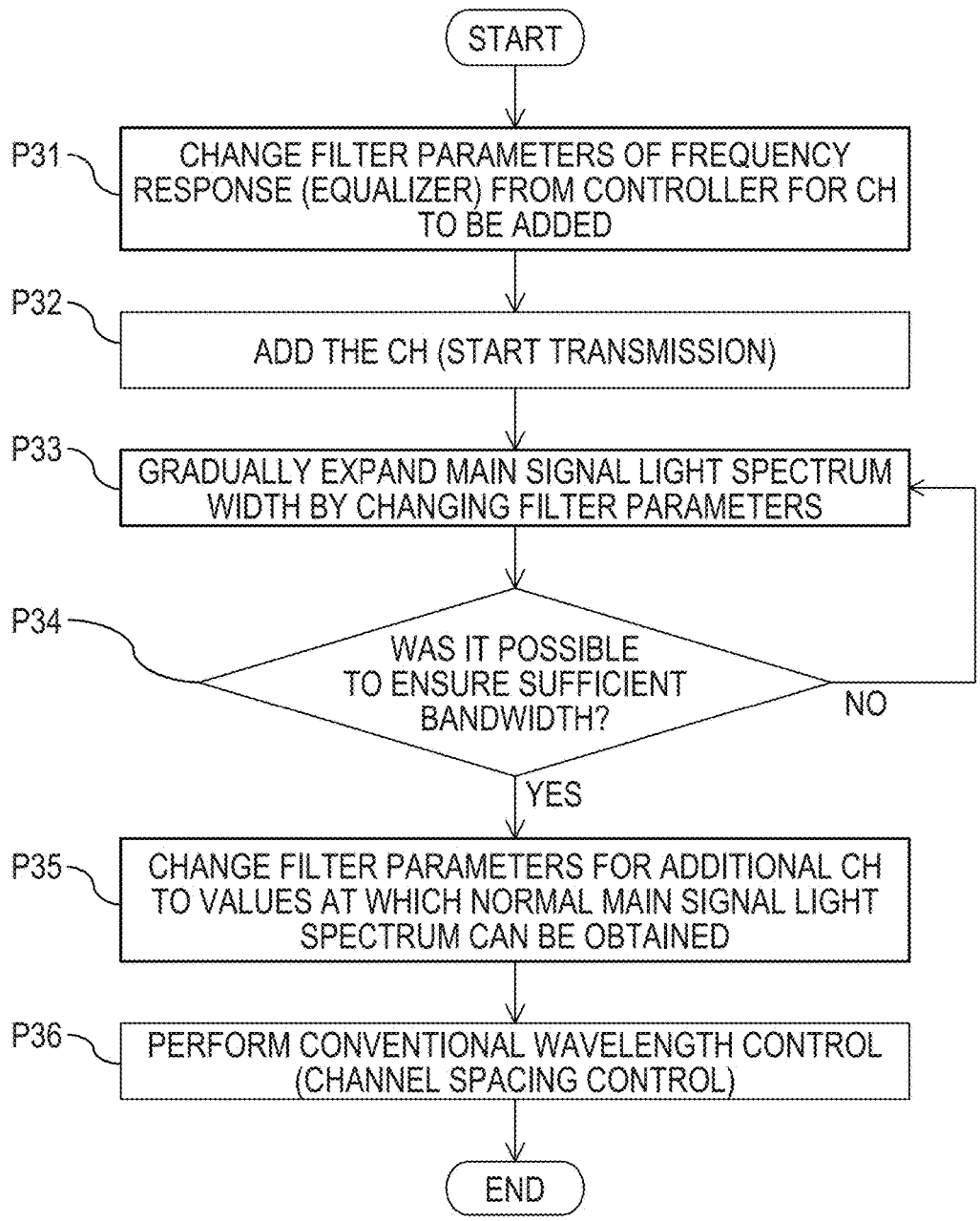
FIG. 25 is a flowchart explaining an operation of the third embodiment.

FIG. 25 is a flowchart illustrating an example of the operation of the third embodiment. As illustrated in FIG. 25, when the channel is added, the setting of the filter parameters of the equalizer 7114 of the transmission digital signal processor 711 corresponding to the channel to be added is adjusted and changed by the controller 73 (operation P31).

The setting change of the filter parameters is, for example, performed so as to narrow the main signal light spectrum. The degree of narrowing may be determined such that crosstalk does not occur between the adjacent channels by the addition of the channel of the main signal light spectrum. For example, the filter parameters may be set such that the main signal light spectrum width is minimized.

By the setting of the filter parameters, the narrowed main signal light spectrum is generated in the optical modulator 713 and transmitted to the optical transmission line 20 by the additional channel (operation P32).

Then, the controller 73 changes the filter parameters such that the main signal light spectrum width of the additional channel is gradually expanded (see, e.g., FIG. 16C) (operation P33).

Also in this embodiment, the other channels different from the additional channel may be adaptively controlled such that the spacing between adjacent channels becomes an appropriate spacing by the channel spacing monitoring described above.

Thus, the adjacent channels of the additional channel are shifted gradually in a direction away from the additional channel according to the expansion of the main signal light spectrum width of the additional channel.

Then, for example, the controller 73 receives the notification of the channel spacing monitored in the opposing station, and determines whether the current main signal light spectrum width (bandwidth) of the additional channel has been expanded to the normal main signal light spectrum width sufficient to transmit the main signal light in an error-free state (operation P34).

As a result of the determination, if it is determined that the bandwidth sufficient to transmit the main signal light in an error-free state is not ensured (NO in operation P34), the controller 73 repeats the change of the filter parameters and the determination of the bandwidth until a sufficient bandwidth is ensured.

If it is determined that a sufficient bandwidth is ensured (YES in operation P34), the controller 73 changes the setting of the filter parameters to the setting in which the normal main signal light spectrum can be obtained (operation P35). Thus, in the optical modulator 713, the main signal light of the additional channel having the normal main signal light spectrum is generated and transmitted to the optical transmission line 20.

Thereafter, as illustrated in FIG. 16E, the same wavelength control as the wavelength control already described for the other channels may be applied to the additional channel. Thus, the channel spacing of the channels including the additional channel is adaptively controlled to become an appropriate spacing (operation P36).

According to the third embodiment described above, similarly to the second embodiment, it is possible to transmit and receive frequency-modulated signals to communicate the wavelength information, the channel spacing monitoring result and the like with the opposing station at a wavelength of the additional channel.

In the third embodiment, the special test pattern as illustrated in the first and second embodiments may not be generated in the transmitter 71. Therefore, as compared to the first and second embodiments, it is possible to achieve a reduction in circuit size and power consumption of the transmitter 71.

Furthermore, in the third embodiment, by changing the filter parameters of the main signal in the transmission digital signal processing, it is possible to easily change the main signal light spectrum width of the additional channel. Thus, it is possible to finely adjust the main signal light spectrum width of the additional channel.

Meanwhile, depending on the degree of narrowing of the main signal light spectrum by the change of the filter parameters, there is a possibility that the opposing station fails to detect the frequency modulation component superimposed on the main signal light. Therefore, information such as the wavelength information and the channel spacing monitoring result, for example, as illustrated in FIG. 21, may be transmitted by being superimposed on the main signal light of another channel different from the additional channel.

(Modification of the Third Embodiment)

In the third embodiment described above, an example of adjusting the main signal light spectrum width of the additional channel by adjusting the filter parameters of the equalizer 7114 of the transmission digital signal processor 711 has been described.

Figure 26:
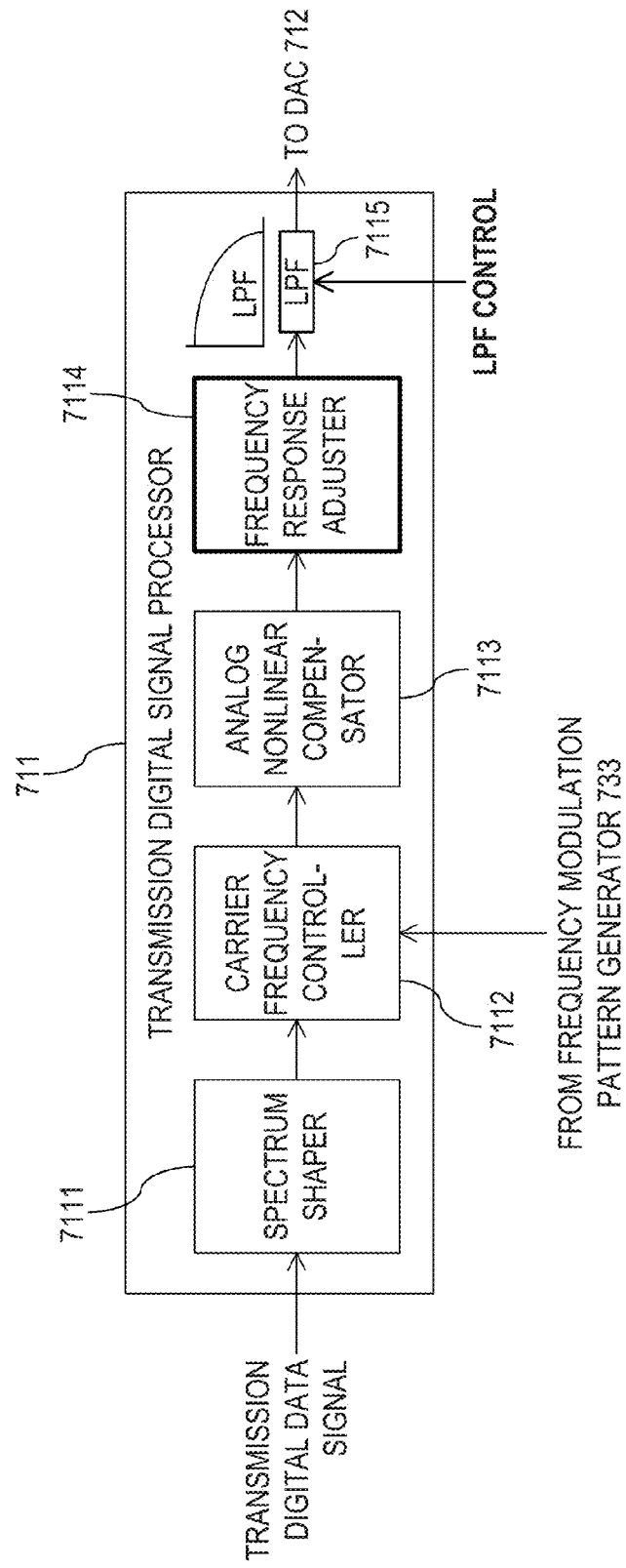
FIG. 26 is a block diagram illustrating an exemplary configuration of a transmission digital signal processor according to a modification of the third embodiment.

However, the adjustment of the main signal light spectrum width of additional channel may be also realized, for example, by changing a low pass filter (LPF) to be applied to the main signal. For example, as illustrated in FIG. 26, apart from the equalizer 7114, a LPF 7115 may be provided in the output of the equalizer 7114.

The LPF 7115 may be implemented by a digital filter similarly to the equalizer 7114. The filter parameters (tap coefficients) of the LPF 7115 may be controlled by the controller 73 similarly to the filter parameters of the equalizer 7114.

The LPF 7115 is similar to the above-described digital filter in terms of being able to restrict the high frequency band of the main signal. By a combination of the equalizer 7114 and the LPF 7115, the filter characteristics to be applied to the main signal may be realized.

Since the filter parameters of the equalizer 7114 and the LPF 7115 can be controlled by the controller 73 common to the equalizer 7114 and the LPF 7115, the control can be simplified, thereby increasing the speed of the control.

FIG. 27 is a flow chart illustrating an operation example of a modification of the third embodiment. As illustrated in FIG. 27, when the channel is added, the filter parameters of the LPF 7115 are set by the controller 73, for example, such that the narrowest band characteristics can be obtained for the channel to be added (operation P41).

Thus, the main signal light spectrum width is minimized. In other words, the band of the main signal light spectrum is restricted by the LPF 7115 such that crosstalk does not occur between the adjacent channels by the addition of the channel of the main signal light spectrum.

The main signal light spectrum narrowed by the application of the LPF 7115 is generated in the optical modulator 713 and transmitted to the optical transmission line 20 by the additional channel (operation P42).

Then, the controller 73 changes the filter parameters (tap coefficients) of the LPF 7115 such that the main signal light spectrum width of the additional channel is gradually expanded (see, e.g., FIG. 16C) (operation P43).

Also in this embodiment, the other channels different from the additional channel may be adaptively controlled such that the spacing between adjacent channels becomes an appropriate spacing by the channel spacing monitoring described above.

Thus, the adjacent channels of the additional channel are shifted gradually in a direction away from the additional channel according to the expansion of the main signal light spectrum width of the additional channel.

Then, for example, the controller 73 receives the notification of the channel spacing monitored in the opposing station, and determines whether the current main signal light spectrum width (bandwidth) of the additional channel has been expanded to a bandwidth sufficient to transmit the main signal light in an error-free state (operation P44).

As a result of the determination, if it is determined that the sufficient bandwidth is not ensured (NO in operation P44), until a sufficient bandwidth is ensured, the controller 73 repeats the change of the filter parameters of the LPF 7115 and the determination of the bandwidth.

If it is determined that a sufficient bandwidth is ensured (YES in operation P44), the controller 73 changes the filter parameters of the LPF 7115 to parameters at which the normal main signal light spectrum width can be obtained (operation P45). Thus, in the optical modulator 713, the main signal light of the additional channel having the normal main signal light spectrum is generated and transmitted to the optical transmission line 20.

Thereafter, as illustrated in FIG. 16E, the same wavelength control as the wavelength control already described for the other channels may be applied to the additional channel. Thus, the channel spacing of the channels including the additional channel is adaptively controlled to become an appropriate spacing (operation P46).

(Others)

In the example described above, as illustrated in FIGS. 16A-16E, an example in which the adjacent channel spacing of the additional channel is expanded by the channel spacing control as the width of the narrowed test pattern spectrum (or main signal light spectrum) is gradually expanded has been explained.

However, for example, after the adjacent channel spacing is expanded in advance, the additional channel may be added. For example, the adjacent channel spacing may be expanded in advance to the extent that the bandwidth sufficient to add the main signal light spectrum of the additional channel without generating crosstalk is ensured. Alternatively, in the expansion control process of the adjacent channel spacing, it is also possible to add the narrow-band spectrum of the additional channel.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus for transmitting wavelength-multiplexed light, the optical transmission apparatus comprising:
    an optical transmitter configured to transmit first light of a first wavelength and second light of a second wavelength adjacent to one another; and
    a controller configured to control the optical transmitter to transmit third light of a third wavelength to be arranged between the first wavelength and the second wavelength while controlling a bandwidth of the third light of the third wavelength to be arranged in a first bandwidth narrower than a spacing between the first wavelength and the second wavelength.

2. The optical transmission apparatus according to claim 1,
    wherein the optical transmitter includes an optical modulator configured to modulate the third light of the third wavelength by a drive signal, and
    wherein the controller controls the drive signal to generate a pattern signal as the third light of the third wavelength so that the bandwidth of the third light of the third wavelength is arranged in the first bandwidth.

3. The optical transmission apparatus according to claim 2,
    wherein the controller controls the drive signal so that the first bandwidth is expanded to a second bandwidth sufficient to transmit main signal light in an error-free state.

4. The optical transmission apparatus according to claim 3,
    wherein the controller controls the drive signal so as to switch the third light of the third wavelength from the pattern signal to a main signal in accordance with expanding of the first bandwidth to the second bandwidth.

5. The optical transmission apparatus according to claim 2,
    wherein the controller includes a digital signal processor to modulate frequency of the pattern signal.

6. The optical transmission apparatus according to claim 1,
    wherein the optical transmitter includes a digital signal processor capable of controlling frequency characteristics of a main signal by digital signal processing, and an optical modulator configured to generate main signal light by modulating the third light of the third wavelength by the main signal processed by the digital signal processor, and wherein the controller controls the frequency characteristics in the digital signal processing so that a bandwidth of the main signal light is arranged in the first bandwidth.

7. The optical transmission apparatus according to claim 6, wherein the controller controls the frequency characteristics so that the first bandwidth is expanded to a second bandwidth sufficient to transmit the main signal light in an error-free state.

8. An optical transmission system comprising:
a transmitting station configured to include:
an optical transmitter configured to transmit first light of a first wavelength and second light of a second wavelength adjacent to one another; and
a controller configured to control the optical transmitter to transmit third light of a third wavelength to be arranged between the first wavelength and the second wavelength while controlling a bandwidth of the third light of the third wavelength to be arranged in a bandwidth narrower than a spacing between the first wavelength and the second wavelength,
wherein the transmitting station transmits wavelength-multiplexed light; and
a receiving station is configured to receive the wavelength-multiplexed light.

9. The optical transmission system according to claim 8,
wherein the receiving station monitors the spacing between the first wavelength and the second wavelength, and notifies the transmitting station of information of monitoring results.

10. A transmission wavelength control method comprising:
controlling a bandwidth of first light of a first wavelength and second light of a second wavelength adjacent to one another in an optical transmission apparatus; and
controlling an optical transmitter to transmit third light of a third wavelength to be arranged between the first wavelength and the second wavelength while controlling a bandwidth of the third light of the third wavelength so that the bandwidth of the third light is expanded so as to be sufficient to transmit main signal light in an error-free state.

* * * * *